United States Patent
Yoshida et al.

(10) Patent No.: US 11,436,718 B2
(45) Date of Patent: Sep. 6, 2022

(54) IMAGE ANALYSIS METHOD, IMAGE ANALYSIS APPARATUS, PROGRAM, LEARNED DEEP LAYER LEARNING ALGORITHM MANUFACTURING METHOD AND LEARNED DEEP LAYER LEARNING ALGORITHM

(71) Applicants: National Cancer Center, Tokyo (JP); SYSMEX CORPORATION, Kobe (JP)

(72) Inventors: Hiroshi Yoshida, Tokyo (JP); Yosuke Sekiguchi, Kobe (JP); Kazumi Hakamada, Kobe (JP); Yuki Aihara, Kobe (JP); Kohei Yamada, Kobe (JP); Kanako Masumoto, Kobe (JP); Krupali Jain, Kobe (JP)

(73) Assignees: NATIONAL CANCER CENTER, Tokyo (JP); SYSMEX CORPORATION, Kobe (JP)

( * ) Notice: Subject to any disclaimer, the term of this patent is extended or adjusted under 35 U.S.C. 154(b) by 0 days.

(21) Appl. No.: 16/192,850

(22) Filed: Nov. 16, 2018

(65) Prior Publication Data
US 2019/0156476 A1 May 23, 2019

(30) Foreign Application Priority Data
Nov. 17, 2017 (JP) .............................. JP2017-222166

(51) Int. Cl.
*G06T 7/00* (2017.01)
*G06V 10/44* (2022.01)
(Continued)

(52) U.S. Cl.
CPC .......... *G06T 7/0012* (2013.01); *G06K 9/6269* (2013.01); *G06N 3/08* (2013.01);
(Continued)

(58) Field of Classification Search
CPC ......... G06T 7/0012; G06T 2207/20084; G06T 2207/30024; G06K 9/00147; G06K 9/4604; G06K 9/4652; G06K 9/6269; G06N 3/08
See application file for complete search history.

(56) References Cited

U.S. PATENT DOCUMENTS

| 8,787,636 B2 | 7/2014 | Marugame |
| 8,965,081 B2 | 2/2015 | Nagase et al. |

(Continued)

FOREIGN PATENT DOCUMENTS

| JP | 2005-525551 A | 8/2005 |
| JP | 2010203949 A | 9/2010 |

(Continued)

OTHER PUBLICATIONS

Esteva et al., "Dermatologist-level classification of skin cancer with deep neural networks," Nature, (Feb. 2, 2017), vol. 542, No. 7639, pp. 115-118 with a corrigendum. (12 pages).

(Continued)

*Primary Examiner* — Jaime M Holliday
(74) *Attorney, Agent, or Firm* — Buchanan Ingersoll & Rooney PC

(57) ABSTRACT

An image analysis method for generating data indicating a tumorigenic state of an image of a tissue or a cell. The image analysis method is an image analysis method for analyzing an image of a tissue or a cell using a deep learning algorithm of a neural network structure, analysis data are generated from the analysis target image including a tissue or cell to be analyzed, the analysis data are input to the deep learning algorithm, and data indicating the tumorigenic state of tissues or cells in the analysis target image are generated by the depth learning algorithm.

21 Claims, 23 Drawing Sheets

(51) Int. Cl.
   *G06V 10/56* (2022.01)
   *G06V 20/69* (2022.01)
   *G06K 9/62* (2022.01)
   *G06N 3/08* (2006.01)

(52) U.S. Cl.
   CPC .............. *G06V 10/44* (2022.01); *G06V 10/56* (2022.01); *G06V 20/698* (2022.01); *G06T 2207/20084* (2013.01); *G06T 2207/30024* (2013.01)

(56) References Cited

U.S. PATENT DOCUMENTS

| | | | |
|---|---|---|---|
| 2008/0144915 A1* | 6/2008 | Wong | G06T 7/42 |
| | | | 382/133 |
| 2011/0049386 A1* | 3/2011 | Kishima | G01N 21/6458 |
| | | | 250/458.1 |
| 2012/0004514 A1 | 1/2012 | Marugame | |
| 2012/0128220 A1 | 5/2012 | Nagase et al. | |
| 2014/0270432 A1* | 9/2014 | Xu | G06K 9/4671 |
| | | | 382/128 |
| 2015/0086103 A1* | 3/2015 | Tsunomori | G06K 9/00147 |
| | | | 382/133 |
| 2016/0005183 A1* | 1/2016 | Thiagarajan | G06T 7/0012 |
| | | | 382/131 |
| 2017/0053398 A1* | 2/2017 | Mahoor | G06K 9/4604 |
| 2017/0169567 A1* | 6/2017 | Chefd'Hotel | G06T 7/0012 |
| 2019/0094115 A1* | 3/2019 | Bhakdi | G01N 33/574 |
| 2019/0114773 A1* | 4/2019 | Song | G06T 7/10 |
| 2019/0178867 A1* | 6/2019 | Luengo Hendriks | |
| | | | G01N 21/6428 |
| 2019/0287240 A1* | 9/2019 | Gaire | G16H 30/40 |
| 2019/0287249 A1* | 9/2019 | Gaire | G06K 9/00147 |
| 2019/0311475 A1* | 10/2019 | Hosoi | A61B 1/00009 |
| 2020/0066407 A1* | 2/2020 | Stumpe | G06T 11/001 |

FOREIGN PATENT DOCUMENTS

| | | |
|---|---|---|
| JP | 2011-30844 A | 2/2011 |
| JP | 2011-527056 A | 10/2011 |
| JP | 2011-527178 A | 10/2011 |
| JP | 2012-255810 A | 12/2012 |
| JP | 2014-142348 A | 8/2014 |
| WO | 03/095995 A1 | 11/2003 |
| WO | 2010/003043 A2 | 1/2010 |
| WO | 2010/003044 A2 | 1/2010 |

OTHER PUBLICATIONS

Litjens et al., "Deep learning as a tool for increased accuracy and efficiency of histopathological diagnosis," Scientific Reports, (May 23, 2016), vol. 6, No. 1, 26286, pp. 1-11. (11 pages).

The extended European Search Report dated Mar. 6, 2019, by the European Patent Office in corresponding European Patent Application No. 18206449.3. (10 pages).

Communication pursuant to Article 94(3) EPC dated Dec. 19, 2019, by the European Patent Office in corresponding European Patent Application No. 18 206 449.3 (7 pages).

E-Pathologist, Apr. 2015, 4 pages.

Sirinukunwattana, Korsuk, et al., "Locality Sensitive Deep Learning for Detection and Classification of Nuclei in Routine Colon Cancer Histology Images", Accepted for Publication in IEEE Transactions on Medical Imaging, Feb. 2016, pp. 1-12.

Xing et al., "An Automatic Learning-Based Framework for Robust Nucleus Segmentation," IEEE Transactions on Medical Imaging, Feb. 2016, vol. 35, No. 2, pp. 550-566.

Notice of Reasons for Refusal dated Sep. 14, 2021, by the Japanese Patent Office in corresponding Japanese Patent Application No. 2017-222178 and an English translation of the Notice. (7 pages).

Notice of Reasons for Refusal dated Oct. 5, 2021, by the Japanese Patent Office in corresponding Japanese Patent Application No. 2017-222166 and an English translation of the Notice. (10 pages).

Communication pursuant to Article 94(3) EPC dated May 25, 2021, by the European Patent Office in corresponding European Patent Application No. 18206449.3. (7 pages).

Decision of Refusal dated Jun. 7, 2022, by the Japanese Patent Office in corresponding Japanese Patent Application No. 2017-222178, and an English translation of the Decision. (7 pages).

* cited by examiner

FIG. 3A
FIG. 3B
FIG. 3C
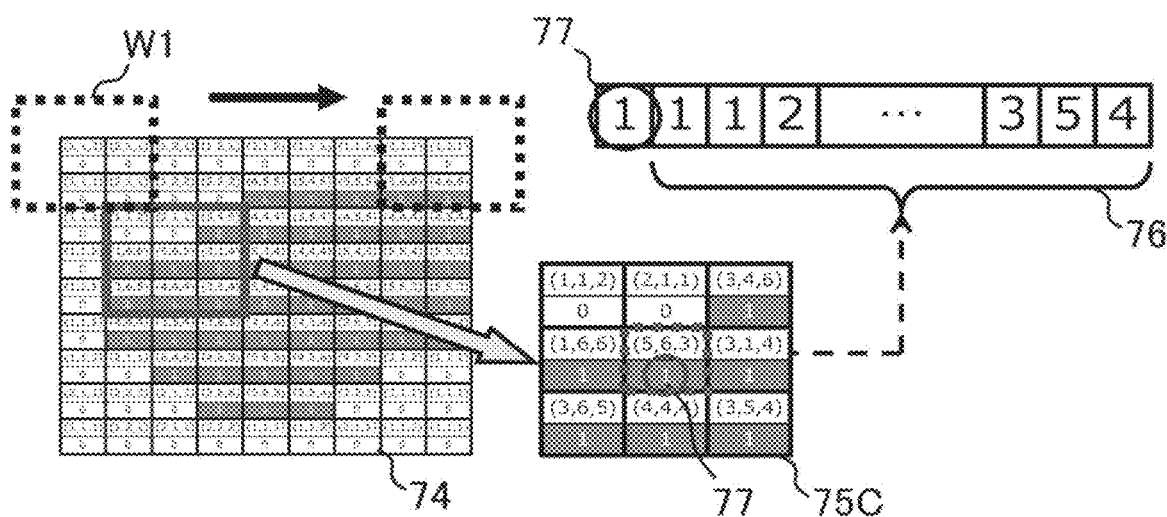

FIG. 4

|         |         |         |         |         |         |         |         | 74NC    |
|---------|---------|---------|---------|---------|---------|---------|---------|---------|
| (1,1,2) | (2,1,1) | (1,2,1) | (1,2,1) | (2,1,2) | (1,1,1) | (1,1,2) | (2,2,2) | (1,2,1) |
| 2       | 2       | 2       | 2       | 0       | 0       | 0       | 0       | 0       |
| (1,1,1) | (2,1,1) | (1,2,2) | (2,2,2) | (4,5,5) | (5,4,6) | (5,5,5) | (5,6,6) | (4,6,6) |
| 2       | 2       | 2       | 2       | 2       | 2       | 0       | 0       | 0       |
| (1,1,1) | (1,1,2) | (2,1,1) | (3,4,6) | (4,4,4) | (3,5,4) | (4,5,5) | (4,4,4) | (4,5,4) |
| 2       | 2       | 2       | 2       | 2       | 2       | 2       | 2       | 0       |
| (1,1,2) | (1,6,6) | (5,6,3) | (3,1,4) | (5,3,4) | (4,4,4) | (5,4,5) | (5,5,4) | (5,5,3) |
| 0       | 2       | 2       | 2       | 2       | 2       | 2       | 2       | 0       |
| (1,2,1) | (3,6,5) | (4,4,4) | (3,5,4) | (5,6,3) | (4,3,4) | (4,6,6) | (5,6,3) | (6,5,3) |
| 0       | 2       | 2       | 2       | 2       | 2       | 2       | 2       | 2       |
| (1,1,1) | (4,4,4) | (3,5,4) | (3,6,5) | (4,4,4) | (4,5,4) | (3,6,5) | (4,4,4) | (4,6,4) |
| 0       | 2       | 2       | 2       | 2       | 2       | 2       | 2       | 2       |
| (1,1,2) | (2,1,1) | (6,4,6) | (4,6,3) | (5,6,3) | (4,5,6) | (4,3,3) | (2,1,2) | (1,1,1) |
| 0       | 0       | 2       | 2       | 2       | 2       | 2       | 2       | 2       |
| (2,1,1) | (2,2,2) | (2,1,2) | (3,6,6) | (5,6,3) | (3,5,4) | (2,2,1) | (2,1,1) | (1,1,1) |
| 0       | 0       | 0       | 2       | 2       | 2       | 2       | 2       | 2       |
| (1,1,1) | (1,2,1) | (2,1,1) | (2,2,2) | (1,1,1) | (1,1,2) | (2,1,1) | (1,1,2) | (1,1,1) |
| 0       | 0       | 0       | 0       | 0       | 0       | 0       | 2       | 2       |

IMAGE ANALYSIS METHOD, IMAGE ANALYSIS APPARATUS, PROGRAM, LEARNED DEEP LAYER LEARNING ALGORITHM MANUFACTURING METHOD AND LEARNED DEEP LAYER LEARNING ALGORITHM

CROSS REFERENCE TO RELATED APPLICATIONS

This application claims priority from prior Japanese Patent Application Publication No. 2017-222166, filed on Nov. 17, 2017, entitled "IMAGE ANALYSIS METHOD, IMAGE ANALYSIS APPARATUS, PROGRAM, LEARNED DEEP LAYER LEARNING ALGORITHM MANUFACTURING METHOD AND LEARNED DEEP LAYER LEARNING ALGORITHM", the entire contents of which are incorporated herein by reference.

FIELD OF THE INVENTION

The present invention relates to an image analysis method, an image analysis apparatus, a program, a method for manufacturing a learned deep layer learning algorithm, and a learned deep layer learning algorithm. More specifically, the present invention relates to an image analysis method, an image analysis apparatus, a program, a method for manufacturing a learned deep layer learning algorithm, and a learned deep layer learning algorithm, which includes generating data indicating a tumorigenic state for an optional position of an image of a tissue or a cell.

BACKGROUND

Japanese Patent Application Publication No. 2010-203949 discloses an image diagnosis support apparatus that determines and classifies a tissue image in a pathological tissue image into four groups of normal, benign tumor, precancerous state, and cancer state. The image classifying means extracts the focus region from the image data, calculates a feature amount indicative of the feature of the focus region, and classifies the group based on the calculated feature amount. Feature amounts are the density of clusters per unit area in the cell nucleus, the density of cluster areas, the area of clusters, the thickness of clusters, and the length of clusters. The image determining means learns the relationship between the feature amount and the determination result and makes a determination based on the learned learning parameter. Learning executes machine learning using learning algorithms such as support vector machines.

SUMMARY OF THE INVENTION

When definitively diagnosing whether a tumor is a malignant tumor, histopathological diagnosis using a histopathological sample is performed. Histopathological diagnosis is often performed as an intraoperative rapid diagnosis to determine the site of excision of tissue containing malignant tumor during surgery. Intraoperative rapid diagnosis is performed while the affected area of the patient is incised and the surgical operation is temporarily halted awaiting a determination of histopathological tissue diagnosis such as whether the tumor is malignant, whether there is tumor remains in the resection margin of the excised tissue, whether there is lymph node metastasis and the like. The result of intraoperative rapid diagnosis determines the subsequent direction of temporarily halted surgery of the patient.

Although the histopathological diagnosis is performed by a physician, particularly a pathologist, by observing the tissue sample with a microscope or the like to diagnose the tissue sample, in order to be able to perform accurate definitive diagnosis by observing the tissue sample, the pathologist must repeatedly observe tissue samples of various cases under supervision of a highly skilled pathologist, such that the training of a pathologist takes an extraordinary amount of time.

There is a serious pathologist shortage, and as a result of this pathologist shortage, there is a delay in the confirmation of the diagnosis of a patient's malignant tumor, a delay in the start of treatment, or the situation in which treatment is started without waiting for the definitive diagnosis. Since both normal tissue diagnosis and rapid intraoperative diagnosis both rely on an insufficiently few pathologists, the workload of the individual pathologist becomes enormous and the labor conditions of the pathologist himself also becomes a problem. However, at present, no solution to this problem has been found.

Therefore, it is considered that enabling a device to support pathological tissue diagnosis will greatly contribute to the elimination of the shortage of pathologists and the improvement of the labor conditions of pathologists, especially as the diagnosis is closer to determination by the human eye.

In view of the fact that the apparatus supports pathological tissue diagnosis in the invention described in the above-mentioned Japanese Patent Application Publication No. 2010-203949, the pathology of the sample tissue is determined based on image analysis by machine learning. In this method, it is necessary to create a feature amount by human hand. There is a problem that the ability of the person to greatly influence the performance of the image analysis in the method of creating the feature amount by human hand.

For example, in tissue diagnosis or cell diagnosis using a microscope, one observation target is the state of the cell nucleus, and malignant tumors and benign tumors are differentiated from the size and form of each cell nucleus, the arrangement state of a plurality of cell nuclei and the like. Therefore, it is very important that the cell nucleus can be accurately extracted in pathological tissue diagnosis as the basis of histological diagnosis and cell diagnosis. The fact that the extracted nuclear region can be automatically detected whether it is a non-tumor cell or a tumor cell aids diagnosis.

The present invention provides an image analysis method, an image analysis apparatus, a program, a method of manufacturing a learned deep layer learning algorithm, and a learned deep layer learning algorithm for generating data indicative of a tumorigenic state in a tissue or cell image.

One aspect of the present invention is an image analysis method. In this aspect, the image analysis method for analyzing an image of a tissue or a cell using a deep learning algorithm (60) of a neural network structure includes generating analysis data (80) from the analysis target image (78) including the tissue or cell to be analyzed (S21 to S23), Inputting the analysis data (80) in the deep learning algorithm (60) (S24), and generating data (82, 83) indicating the tumorigenic state of tissue or cells in the analysis target image (78) by the deep learning algorithm (60) (S25 to S28). In this way it is possible to generate data indicating the tumorigenic state of tissues or cells in the analysis target image.

It is preferable that the image to be analyzed is an image of a tissue diagnostic specimen and the analysis target image (78) contains a hue consisting of one primary color or contains hues (R, G, B) combining two or more primary colors.

It is preferable that the image to be analyzed is an image of a cell diagnostic specimen and the analysis target image (78) contains a hue consisting of one primary color or contains hues (R, G, B) combining two or more primary colors.

It is preferable that the data (82, 83) indicating the tumorigenic state are data for distinguishing and presenting the nuclear region of a tumor cell and other regions.

It is preferable that the data (82, 83) indicating the tumorigenic state are data indicating the boundary between the nuclear region of the tumor cell and the other regions.

The deep learning algorithm (60) preferably determines whether the target image is a nucleus of a tumor cell or a nucleus of a non-tumor cell.

It is preferable to generate a plurality of analysis data (80) for each region of a predetermined number of pixels for one analysis target image (78). In this way it is possible to improve the discrimination accuracy of the neural network (60).

The analysis data (80) preferably are generated for each area of a predetermined number of pixels including peripheral pixels circumscribing a predetermined pixel, and the deep learning algorithm (60) generates a label indicating a tumorigenic state of the predetermined pixel from the input analysis data (80). In this way it is possible to improve the discrimination accuracy of the neural network (60).

It is preferable that the number of nodes of the input layer (60a) of the neural network (60) corresponds to the product of the number of combined primary colors with the predetermined number of pixels of the analysis data (80). In this way it is possible to improve the discrimination accuracy of the neural network (60).

It is preferable that the sample is a stained sample, and the analysis target image (78) is an image obtained by imaging the stained sample under a bright field microscope.

The training data (74C, 74NC) used for learning of the deep learning algorithm (60) preferably are generated based on a bright field image (70C, 70NC) captured under a bright field microscope of a stained image of a sample prepared by staining for bright field observation of a sample of a tissue specimen containing a tumor collected from an individual or a sample of material containing a tumor cell collected from an individual, fluorescence image (71C, 71NC) of a cell nucleus captured under a fluorescence observation microscope of a stained image of a sample prepared with a fluorescent nuclear stain corresponding to the specimen or the same specimen, such that the position of the fluorescence images (71C, 71NC) in the sample of the fluorescence images (71C, 71NC) correspond to the position in the sample of the acquired bright field image (70C, 70NC).

The stain used for bright field observation is preferably hematoxylin nucleus stain.

When the sample is a tissue sample, the bright field observation stain is preferably hematoxylin-eosin stain, and when the sample is a sample containing cells, the bright field observation stain is preferably a Papanicolaou stain.

It is preferable that the training data (74C, 74NC) includes a label value indicating the tumorigenic state of the cell extracted from the bright field image (70C, 70NC) and the fluorescence image (71C, 71NC). In this way it becomes possible for the neural network (50) to learn a label value indicating the tumorigenic state of the cell.

It is preferable that the training data (74C, 74NC) include label values of each pixel of the bright field image (70C, 70NC). In this way it becomes possible for the neural network (50) to learn a label value indicating the tumorigenic state of the cell.

It is preferable that the training data (74C, 74NC) are generated for each area of the predetermined number of pixels in the bright field image (70C, 70NC). In this way it is possible to cause the neural network (50) to learn the label value indicating the tumorigenic state of the cell with high accuracy.

It is preferable that the deep learning algorithm (60) classifies the analysis data (80) into classes indicating the tumorigenic state of the cells contained in the analysis target image (78). In this way it is possible to classify the tumorigenic state for arbitrary positions of the analysis target image including the cells.

It is preferable that the output layer (60b) of the neural network (60) is a node having a soft max function as an activation function. In this way it is possible for the neural network (60) to classify arbitrary positions of the analysis target image including cells into a finite number of classes.

The deep learning algorithm (60) preferably generates data (82) indicating the tumorigenic state contained in the analysis target image (78) for each unit pixel each time the analysis data (80) are input. In this way it is possible to classify the tumorigenic state for each unit pixel (one pixel) of the analysis target image including cells.

It is preferable that the deep learning algorithm (60) is generated according to the type of tissue sample or the type of sample containing cells. In this way it is possible to selectively use the deep learning algorithm (60) according to the type of analysis target image including cells, and it is possible to improve the discrimination accuracy of the neural network (60).

The analysis data (80) preferably are processed using a deep learning algorithm (60) corresponding to the type of sample selected from a plurality of deep learning algorithms (60) according to the type of the tissue sample or the type of the sample including the cells. In this way it is possible to selectively use the deep learning algorithm (60) according to the type of analysis target image including cells, and it is possible to improve the discrimination accuracy of the neural network (60).

One aspect of the present invention is an image analysis apparatus, a processing unit (20A) for generating data (82, 83) indicating the tumorigenic state of the tissue or cells in the analysis target image (78) In this aspect, the image analysis apparatus (200A) analyzes an image of a tissue or a cell using a deep learning algorithm (60) of a neural network structure, and includes a processing unit (20A) for generating data (82, 83) indicating the tumorigenic state of the tissue or cells in the analysis target image (78) by a deep learning algorithm (60), and generating analysis data (80) from an analysis target image (78) that includes tissues or cells to be analyzed, and inputting the analysis data (80) in the depth learning algorithm (60). In this way it is possible to generate data indicating the tumorigenic state of tissues or cells in the analysis target image.

One aspect of the invention is a computer program. In this aspect, the computer program is a computer program for analyzing an image of a tissue or a cell using a deep learning algorithm (60) of a neural network structure, the computer program causing a computer to execute a process to generate analysis data (80) from an analysis target image (78) including analysis target tissue or cells, a process to input the analysis data (80) in a deep learning algorithm (60), and a process to generate data (82, 83) indicating the tumorigenic state of the tissue or cell in the analysis target image (78) by the deep learning algorithm (60). In this way it is possible to generate data indicating the tumorigenic state of tissues or cells in the analysis target image.

One aspect of the present invention is a method of manufacturing a learned deep learning algorithm. In this aspect, the method of manufacturing the learned deep learning algorithm (60) includes a first acquisition step (S10) of acquiring first training data (72r, 72g, 72b) corresponding to a first training image (70C) obtained by imaging a tumor tissue or a tumor cell, a second acquisition step (S13a) of acquiring second training data (73C) corresponding to a second training image (71C) indicating the nuclear region of the tumor cells in the first training image (70C), a third acquisition step (S10) of acquiring third training data (72r, 72g, 72b) corresponding to an acquired third training image (70NC) of a non-tumor tissue or a non-tumor cell, a fourth acquisition step (S13b) of acquiring fourth training data (73NC) corresponding to a fourth training image (71NC) indicating a nuclear region of non-tumor cells in the third training image (70NC), a learning step (S14 to S20) for causing the neural network (50) to learn the relationship between the first training data (72r, 72g, 72b) and the second training data (73C), and a learning step (S14 to S20) for causing the neural network (50) to learn the relationship between the third training data (72r, 72g, 72b) and the fourth training data (73NC). In this way it is possible to produce a deep learning algorithm for generating data indicating the tumorigenic state of tissues or cells in the analysis target image.

The first training data (72r, 72g, 72b) and the third training data (72r, 72g, 72b) preferably are set as the input layer (50a) of the neural network (50), and the second training data (73C) and the fourth training data (73C) preferably are set as the output layer (50b) of the neural network (50) corresponding to each of the first training data (72r, 72g, 72b) and the third training data (72r, 72g, 72b).

It is preferable that a step (S10) of generating first training data (72r, 72g, 72b) from the first training image (70C) is included before the first acquisition step, a step (S13a) of generating the second training data (73C) from the second training image (71C) is included before the second acquisition step, a step (S10) of generating third training data (72r, 72g, 72b) from the third training image (70NC) is included before the third acquisition step, and a step (S13b) of generating fourth training data (73NC) from the fourth training image (71NC) is included before the fourth acquisition step. In this way it is possible to produce a deep learning algorithm for generating data indicating the tumorigenic state of tissues or cells in the analysis target image.

It is preferable that the first training image (70C) is a bright field image (70C) including tumor cells captured under a bright field microscope of a stained image of a sample prepared by staining for bright field observation of a sample including tissue material collected from an individual or cells collected from an individual, the second training image (71C) is preferably a fluorescence image (71C) captured under microscopic fluorescence observation of a stained image of a sample prepared by fluorescent nuclear staining of a tissue material or material containing cells such that the position of the fluorescence image (71C) in the sample is a fluorescence image (71C) corresponding to the position of the acquired first training image (70C) in the sample, the third training image (70NC) is preferably a bright field image (70NC) including non-tumor cells captured under a bright field microscope of a stained image of a sample prepared by staining for bright field observation a tissue sample taken from an individual or a sample containing cells collected from the individual, the fourth training image (71NC) is preferably a fluorescence image (71NC) captured under microscope fluorescence observation of a staining image of a sample prepared by fluorescence nuclear staining of a tissue sample or a sample containing cells such that the position of the fluorescence image (71NC) in the sample is a fluorescence image (71NC) corresponding to the position of the acquired third training image (70NC) in the sample.

One aspect of the present invention is a learned deep learning algorithm (60). In this aspect, the learned deep learning algorithm (60) sets the first training data (72r, 72g, 72b) and the third training data (72r, 72g, 72b) as the input layer (50a) of the neural network (50), and sets the second training data (73C) and the fourth training data (73NC) as the output layer (50b) of the neural network (50) corresponding to the first training data (72r, 72g, 72b) and the third training data (72r, 72g, 72b) in the learned deep learning algorithm (60); wherein the first training data (72r, 72g, 72b) are generated from the first training image (70C) of imaged tumor tissue or tumor cells, the second training data (73C) show the nuclear regions of the tumor cells in the first training image (70C), the third training data (72r, 72g, 72b) are generated from a third training image (70NC) of imaged non-tumor tissue or non-tumor cells, and the fourth training data (73NC) show the nuclear region of non-tumor cells in the third training image (70NC).

According to the invention, data indicating a tumorigenic state can be generated for any position of the image of the tissue or cell.

BRIEF DESCRIPTION OF THE DRAWINGS

FIGS. 3A-3C are schematic diagrams illustrating the details of training data;

FIG. 4 is a schematic diagram illustrating the details of training data;

DESCRIPTION OF THE EMBODIMENTS OF THE INVENTION

Figure 1:
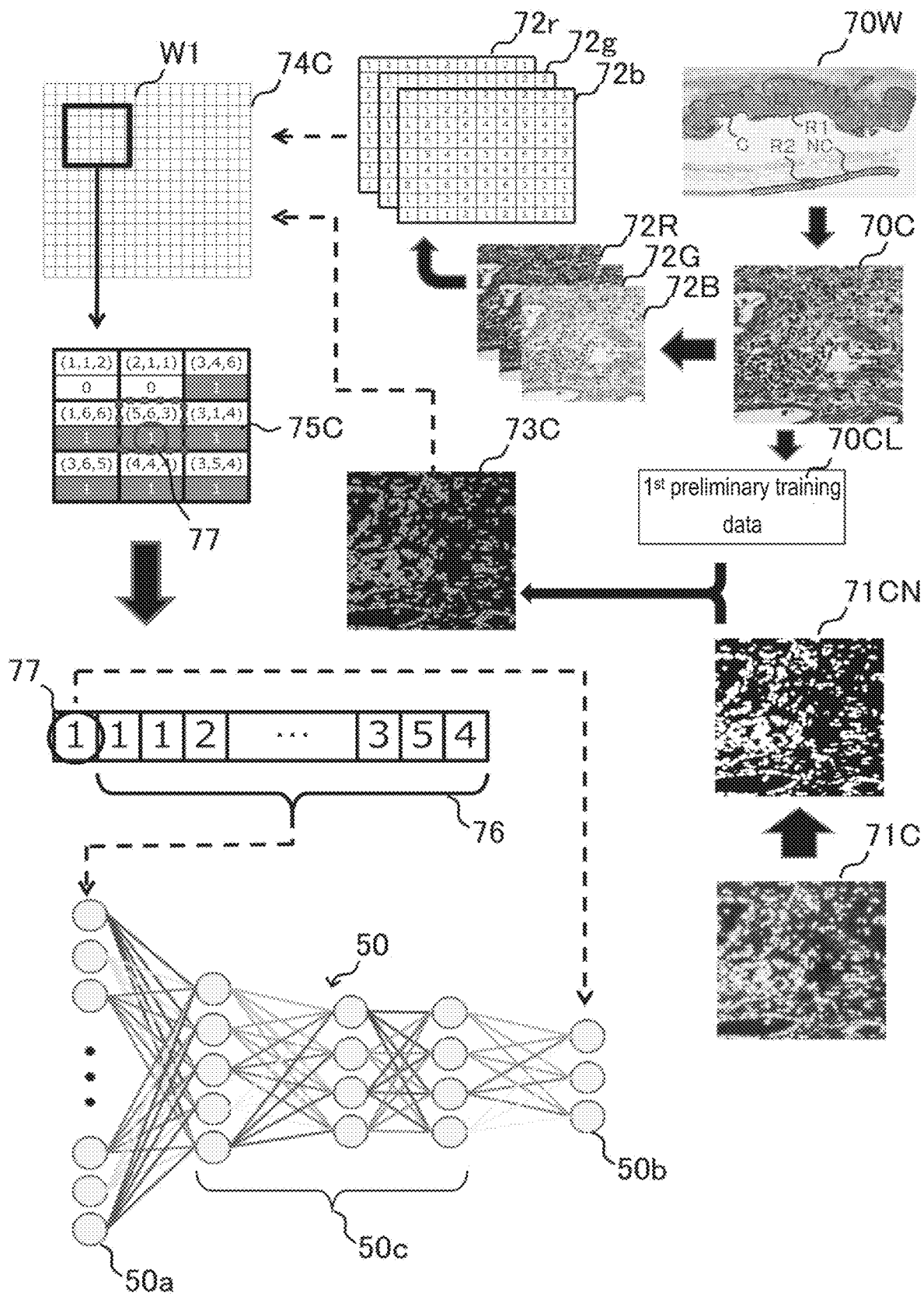
FIG. 1 is a schematic diagram illustrating a summary of a deep learning method.

Hereinafter, a summary and an embodiment of the invention will be described in detail with reference to the accompanying drawings. Note that in the following description and drawings the same reference numerals denote the same or similar constituent elements, and therefore, descriptions of the same or similar constituent elements are omitted.

The invention relates to an image analysis method for analyzing an image of a tissue or a cell, the image analysis method using a deep learning algorithm of a neural network structure, preferably a convolutional neural network structure.

In the present invention, an image of a tissue or a cell is an image obtained from a tissue sample or a sample containing a cell. Samples of tissue samples or samples containing cells are taken from individuals. The individual is not particularly limited, but is preferably a mammal, more preferably a human. Whether an individual is alive or deceased when a sample is taken from the individual is irrelevant. The tissue is not limited as long as it is present in the individual. Examples of tissues collected from an individual include surgical excised tissue, biopsy tissue and the like. Samples containing the cells are not limited insofar as they are taken from individuals. For example, sputum, pleural effusion, ascites, urine, cerebrospinal fluid, bone marrow, blood, cystic fluid and the like can be mentioned. The samples, including the tissue and the cells, may comprise tumor cells. The tumor may be either benign or malignant. The tumor may be either epithelial or non-epithelial. The tumor is preferably a malignant epithelial tumor. Although the malignant tumor is not particularly limited, examples of malignant tumors include respiratory system malignant tumor arising from the trachea, bronchus or lung and the like; respiratory system malignancy such as nasopharynx, esophagus, stomach, duodenum, jejunum, ileum, cecum, appendix, ascending colon, transverse colon, sigmoid colon, rectum or anus and the like, malignant tumor of the gastrointestinal system; a liver cancer; a pancreatic cancer; a urinary system malignant tumor arising from bladder, ureter or a kidney; female reproductive system malignant tumor arising from ovary, oviduct and uterus and the like; breast cancer; prostate cancer; skin cancer; endocrine system malignant tumor such as the hypothalamus, pituitary gland, thyroid, parathyroid gland, and adrenal gland; solid malignant tumor originating from the central nervous system; malignant tumor of bone soft tissue. More preferably, respiratory epithelial malignancies such as lung cancer (squamous cell carcinoma, small cell carcinoma, large cell carcinoma, adenocarcinoma) and the like; respiratory epithelial malignancies such as gastric cancer, duodenal cancer, colon cancer (sigmoid colon cancer, rectal cancer and the like); gastrointestinal epithelial malignancy; liver cancer; pancreatic cancer; bladder cancer; thyroid cancer; ovarian cancer; breast cancer; prostate cancer. Most preferable is gastric cancer.

The sample is intended as a preparation to prepare a sample including the tissue sample or sample including cells to be process for observation by microscope and the like. The sample can be prepared according to a known method. For example, in the case of a tissue sample, after tissue is collected from an individual, the tissue is fixed with a prescribed fixing solution (formalin fixative or the like), the fixed tissue is embedded in paraffin, and the paraffin-embedded tissue is sliced. The sliced section is placed on a slide glass. The sample is completed by subjecting the slide glass with slice to staining for observation with an optical microscope, that is, for bright field observation, and performing prescribed sealing treatment. A typical example of a tissue sample is a tissue diagnostic sample (pathological specimen), and the staining is hematoxylin-eosin (HE) staining.

For example, in the case of a sample containing cells, the cells in the sample are attached to a slide glass by centrifugation, smearing or the like, fixed with a predetermined fixing solution (ethanol or the like), stained for bright field observation, and a predetermined sealing process is carried out to complete the sample. A typical example of a sample containing cells is a sample for cytological diagnosis (cytological specimen), and staining is Papanicolaou staining. The cell diagnostic sample also includes an imprinted sample of the tissue collected for the tissue sample.

Both HE staining and Papanicolaou staining are nuclear staining with hematoxylin. Hematoxylin is widely used as a nuclear stain in tissue cell staining (for example, immunostaining, lectin staining, sugar staining, fat staining, collagen fiber staining and the like). Therefore, the invention can be applied to all samples using hematoxylin for nuclear staining.

For the image analysis, a learned deep layer learning algorithm trained using four types of training images is used. The image analysis generates analysis data from an analysis target image including tissue or cells to be analyzed acquired from the sample. Analysis data are input to the depth learning algorithm and data indicating a tumorigenic state of cells present in the analysis target image are generated. A tumorized state means that the tissue at the position of the target pixel in the discrimination target is a tumor. Preferably, the tumorized state means whether the tissue at the position of the target pixel in the discrimination target is a tumor. The data indicating the tumorigenic state are data indicating whether the nuclear region of the cell present in the analysis target image is the nuclear region of a tumor cell or the nuclear region of a non-tumor cell. The data indicating the tumorigenic state may be a label value or the like capable of discriminating between a nuclear region of a tumor cell, a nuclear region of a non-tumor cell, and a region that is neither a nuclear region of a tumor cell nor a nuclear region of a non-tumor cell.

Among the four kinds of training images, the first training image is an image including tumor tissue or tumor cells included in a sample of a tissue sample containing a tumor collected from an individual, or a sample of a sample including tumor cells. This image is obtained from samples stained so that the tissue structure or cell structure can be recognized by microscopic observation. Although the stain is not limited insofar as the tissue structure or the cell structure can be recognized, a stain for bright field observation is preferable. The above-described bright field observation staining is not limited insofar as at least the cell nucleus and a part other than the cell nucleus can be stained so as to be distinguishable by hue. When the sample is a mammalian tissue sample, for example, HE staining can be mentioned. For example, when the sample is a sample containing mammalian cells, Papanicolaou stain can be mentioned.

The first training data and the first preliminary training data are generated from the first training image. The first training data are information on a single color image obtained by separating the hue included in the first training image for each primary color. The first preliminary training data are binarized data indicating that the cells included in the first training image are nuclear regions of tumor cells. That the tissue or cells contained in the first training image contain tumor cells is determined, for example, by sample diagnosis by a physician. A label value indicating "this is a region of tumor cells" is generated as the first preliminary training data generated from the first training image.

Among the four types of training images, the second training image indicates where in the first training image the nucleus region of the cell is, that is, the second training image is an image showing which region of the first training image is the correct answer "this is a cell nuclear region". The image of the cell is preferably an image showing the nuclear region of the tumor cell. This image is obtained by selectively irradiating a cell nucleus of a sample that is the same sample from which the first training image was acquired or a sample corresponding to the sample from which the first training image was acquired (for example, a consecutively sliced sample), and the image is captured after performing fluorescent nuclear staining. The fluorescent nucleus stains includes, but is not limited to, 4',6-diamidino-2-phenylindole (DAPI) stain. The second preliminary training data are generated from the second training image. The second preliminary training data are binarized data generated by binarizing the second training image and indicate either a region of the cell nucleus or another region.

The second preliminary training data and the first preliminary training data are associated with each pixel, and a label value indicating "this is a nuclear region of a tumor cell" is given to the pixels indicating the cell nucleus region in the second preliminary training data. Data to which a label value indicating "this is a nuclear region of a tumor cell" is attached to the region of the cell nucleus in the second preliminary training data are used as the second training data.

Of the four kinds of training images, the third training image is a non-tumor tissue or non-tumor cell contained in a sample of a tissue sample taken from an individual or a sample containing cells collected from an individual. This image is obtained from samples stained so that the tissue structure or cell structure can be recognized by microscopic observation. Although the stain is not limited insofar as the tissue structure or the cell structure can be recognized, a stain for bright field observation is preferable. The above-described bright field observation staining is not limited insofar as at least the cell nucleus and a part other than the cell nucleus can be stained so as to be distinguishable by hue. When the sample is a mammalian tissue sample, for example, HE staining can be mentioned. For example, when the sample is a sample containing mammalian cells, Papanicolaou stain can be mentioned. It is preferable that the stain is the same as the stain applied to the sample when acquiring the first training image.

Third training data and third preliminary training data are generated from the third training image. The third training data are information related to a single color image obtained by separating the hues included in the third training image for each primary color. The third preliminary training data are binarized data indicating that the cells contained in the third training image are regions of non-tumor cells. That the tissue or cells contained in the third training image includes non-tumor cells is determined, for example, by diagnosis of a sample by a physician. A label value indicating "this is a region of non-tumor cells" is generated as the third preliminary training data generated from the third training image.

Among the four kinds of training images, the fourth training image indicates where the nucleus region is in the third training image, that is, the fourth training image is an image showing which region of the third training image is the correct answer "this is a cell nucleus region". The image of the cell is preferably an image showing a nuclear region of a non-tumor cell. This image is obtained by selectively irradiating a cell nucleus of a sample that is the same sample from which the first training image was acquired or a sample corresponding to the sample from which the third training image was acquired (for example, a consecutively sliced sample), and the image is captured after performing fluorescent nucleus staining. The fluorescent nucleus stains includes, but is not limited to, 4',6-diamidino-2-phenylindole (DAPI) stain. It is preferable that the stain is the same as the stain applied to the sample at the time of acquiring the second training image. Fourth preliminary training data are generated from the fourth training image. The fourth preliminary training data are binarized data generated by binarizing the fourth training image and indicate either a region of the cell nucleus or another region.

The fourth preliminary training data and the third preliminary training data are associated with each pixel, and in the fourth preliminary training data, and a label value indicating "this is a nuclear region of a non-tumor cell" is given to the pixels indicating the cell nucleus region. Data in which a label value indicating "this is a nuclear region of a non-tumor cell" is added to the region of the cell nucleus in the second preliminary training data, and are used as the fourth training data.

The training data include tumor site training data and non-tumor site training data.

The nuclear region of the cell refers to a region containing one or more nuclei.

A case in which the tumorigenic state of the cells contained in an image obtained by imaging an HE-stained tissue sample is discriminated by the deep learning algorithm is described as an example in the summary and the embodiment of the invention.

Summary of Deep Learning Method and Image Analysis Method

First, a summary of the deep learning method and image analysis method will be described. Next, each of the plurality of embodiments of the present invention will be described in detail.

Summary of Deep Learning Method

FIG. 1 shows an example of input of training data to a neural network using a whole slide image 70W including a tumor tissue and a non-tumor tissue. The region surrounded by the solid line indicated by the symbol C shown in the whole slide image 70 W indicates the region of the tumor tissue. Symbol R1 indicates an area used as the first training image 70C. A region surrounded by a solid line indicated by a symbol NC indicates a region of non-tumor tissue. Symbol R2 is a region used as the third training image 70NC (shown in FIG. 2). Whether the first training image 70C includes a tumor tissue may be determined before obtaining the first training image 70C or after determination of the first training image is acquired. The same also applies to whether the third training image 70NC includes a non-tumor tissue, and it may be determined before acquiring the third training image 70NC or may be determined after the third training image 70NC is acquired.

In FIG. 1, a plurality of hues are included in the first training image 70C since the first training image 70C captures an HE-dyed sample, for example, as color images under microscopic bright-field observation.

The first training image (bright field image) 70C can be acquired in advance using an image acquiring device such as a known optical microscope, fluorescent microscope, or virtual slide scanner, for example. Illustratively, in this embodiment it is preferable that color imaging acquired from the image acquiring device is 24-bit color with RGB color space. For the 24-bit color of RGB, it is preferable to express the respective densities (color densities) of red, green and blue with 8 bits (256 levels). The first training image (bright field image) 70C may be an image including one or more primary colors. The first training data and the first preliminary training data 70CL are generated from the first training image 70C.

In the present invention, the hue is illustratively defined by a combination of the three primary colors of light or a combination of the three primary colors of the color. The first training data are generated from the first training image 70C by separating the hues appearing in the first training image 70C into individual primary colors, generating data for each primary color, data represented by a code corresponding to the density. In FIG. 1, single color images 72R, 72G, and 72B separated for each primary color of red (R), green (G), and blue (B) which are the three primary colors of light.

When the color density of each color is encoded for each pixel on the single color images 72R, 72G, and 72B, the entire image is encoded for each image of R, G, and B by the encoding diagrams 72r, 72g, and 72b. The color density also may be encoded with numerical values indicating 256 gradations of each color. The color density also may be pre-processed for numerical values indicating 256 gradations of each color, and the color density of each pixel may be encoded with numbers indicated by eight levels from 0 to 7, for example. The color density encoding diagrams 72r, 72g, and 72b in the single color image of each color of R, G, and B shown in the example of FIG. 1 represent the color density in each pixel at eight gradations of values from 0 to 7 (three tones expressing tone). The color density encoded diagrams 72r, 72g, and 72b shown in FIG. 1 are the first training data. Symbols indicating color densities are also referred to as color density values in this specification.

In FIG. 1, the first preliminary training data 70CL are binarized data indicating that the tissue is a tumor cell relative to the tissue included in the first training image 70C. The binarized data also may be image data or a label value corresponding to each pixel in the first training image 70C. For example, since the first training image 70C is a tumor tissue, the same numerical value is given as a label value indicating that it is a tumor cell to all the pixels in the first training image 70C.

In FIG. 1, the second training image 71C is an image obtained by capturing fluorescent nuclei-stained samples by fluorescence observation under a fluorescence microscope and capturing images or color images of gray scales of two or more gradations. The second training image 71C may be acquired in advance, for example, using a known bright field image acquisition device such as a fluorescence microscope or a virtual slide scanner. The second preliminary training data 71CN is generated from the second training image 71C.

The second preliminary training data 71CN are binarized data indicating a region of the cell nucleus of the learning target tissue, which are generated from the second training image 71C of imaged learning target tissue.

The second preliminary training data 71CN are generated by converting the second training image 71C of grayscale or color of 2 gradations or more into data of a monochrome fluorescence image by binarization processing. The region of the cell nucleus and the other regions are distinguished, and the region of the cell nucleus is discriminated by binarizing the second training image 71C. Whether the region is a cell nucleus region or a region other than the cell nucleus is determined, for example, by comparing the color density of each pixel in the image with a predetermined condition (for example, a color density threshold value). The binarized data also may be image data or a label corresponding to each pixel in the second training image 71C. For example, "1" is assigned to a pixel indicating the region of the cell nucleus, and "0" is assigned to the regions other than the region of the cell nucleus.

Next, the second training data 73C are generated. The second training data 73C are data generated from the first preliminary training data 70CL and the second preliminary training data 71CN, and are data to be learned as correct in the neural network 50 of the true image 73C. Since the second training data 73C are generated from the first training image 70C and the second training image 71C including the tumor tissue, the correct answer indicating the tumorigenic state of the tissue or the cell is the nuclear region of the tumor cell. The second training data 73C include a label value indicating the nuclear region of the tumor cell corresponding to each pixel of the second training image 71C and a label value indicating the other region separately. For example, the label value indicating the nuclear region of the tumor cell is "1", and the label indicating the other region is "0". The second training data 73C shown in FIG. 1 are shown as an image for convenience of description, but when input to the neural network, each pixel is provided with a nuclear region of a tumor cell and another region to which label values are given to differentiate one from another.

In the deep learning method, the color density encoded diagrams 72r, 72g, and 72b (also referred to as first training data) and the second training data 73C shown in FIG. 1 are used as the tumor site training data 74C. Specifically, the neural network 50 learns the color density encoded diagrams 72r, 72g, 72b as the input layer 50a and the second training data 73C as the output layer 50b. That is, the neural network 50 is caused to learn the pair relationship between the color density encoded diagrams 72r, 72g, and 72b of each color of R, G, and B and the second training data 73C.

Figure 2:
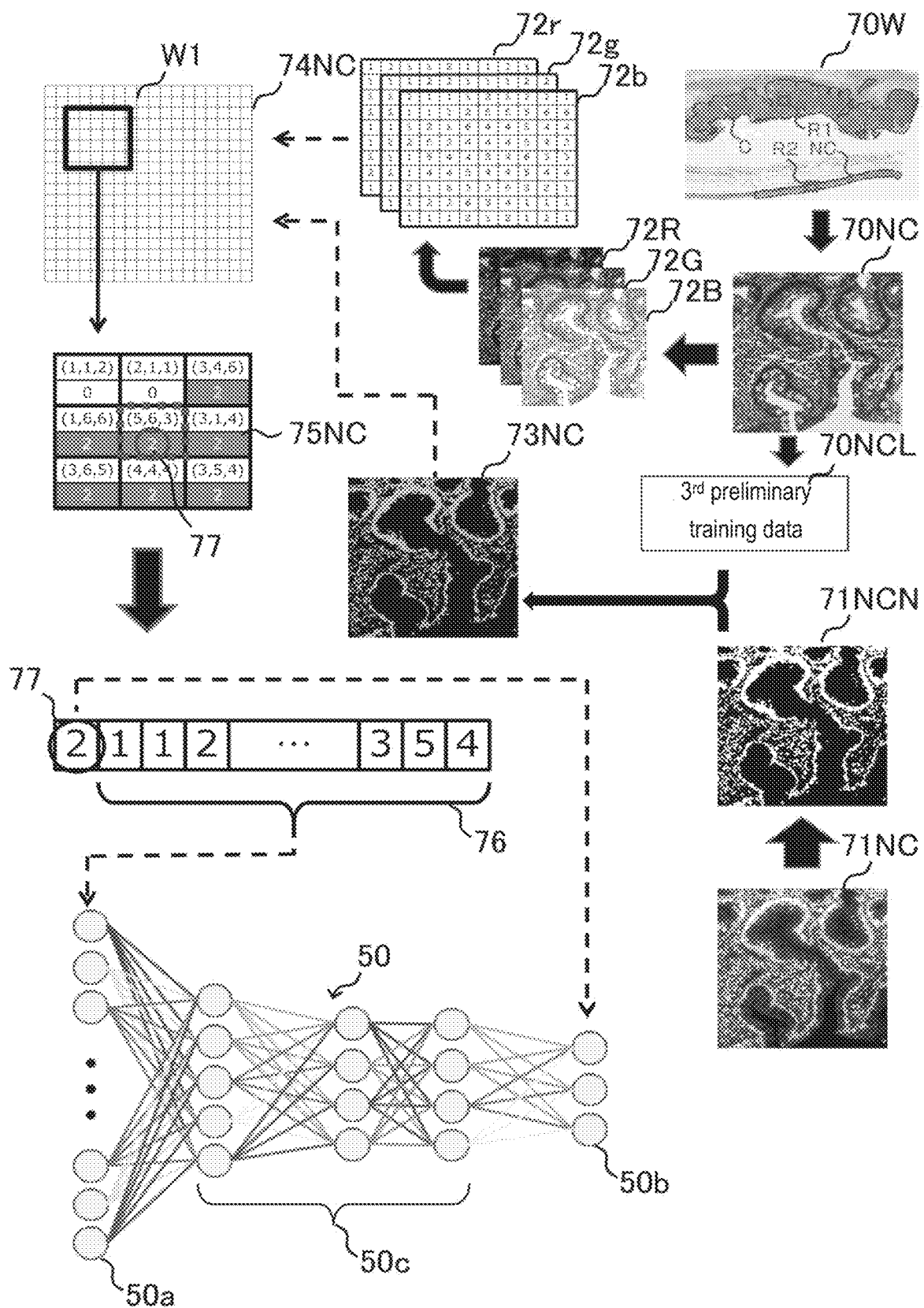
FIG. 2 is a schematic diagram illustrating a summary of a deep learning method.

In FIG. 2, the whole slide image 70W is the same as FIG. 1. The third training image 70NC contains a plurality of hues since the third training image 70NC captures the HE-stained sample as a color image under microscopic bright-field observation.

The third training image (bright field image) 70NC is generated in the same manner as the first training image 70C. The third training data and third preliminary training data 70NCL are generated from the third training image 70 NC.

The third training data are generated in the same way as the first training data. The color density encoded diagrams 72r, 72g, and 72b shown in FIG. 3 are the third training data.

In FIG. 2, the third preliminary training data 70 NCL are binarized data indicating that the tissue contained in the third training image 70NC is a non-tumor cell. The binarized data also may be image data or a label value corresponding to each pixel in the third training image 70NC. For example, since the third training image 70NC is a non-tumor tissue, the same numerical value is assigned as a label value indicating that it is a non-tumor cell to all the pixels in the third training image 70NC. The numerical value indicating that it is a non-tumor cell is distinguished from the numerical value indicating a tumor cell.

In FIG. 2, the fourth training image 71NC is an image obtained by capturing fluorescent nuclei-stained samples under fluorescence observation by a fluorescence microscope and capturing images or color images at gray scales of two or more gradations. The fourth training image 71NC can be obtained in advance using a known bright field image acquisition device such as a fluorescence microscope or a virtual slide scanner. The fourth preliminary training data 71NCN are generated from the fourth training image 71NC.

The fourth preliminary training data 71NCN are generated in the same way as the second preliminary training data 71CN.

Next, the fourth training data 73NC are generated. The fourth training data 73NC are data generated from the third preliminary training data 70NCL and the fourth preliminary training data 71NCN, and are data to be learned as a correct by the neural network 50 of the true value image 73NC. Since the fourth training data 73NC are generated from the third training image 70NC and the fourth training image 71NC including the non-tumor tissue, the correct interpretation indicating the tumorigenic state of the tissue or the cell is a non-nuclear area. The fourth training data 73NC includes a label value that distinguishes the nuclear region of the non-tumor cell corresponding to each pixel of the fourth training image from other regions. For example, the label value indicating the nuclear region of the non-tumor cell is "2", and the label value indicating the other region is "0". The fourth training data 73NC shown in FIG. 2 are shown as an image for convenience of explanation, but when input to the neural network, each pixel is given a label value to differentiate the nuclear region of the tumor cell and the other regions.

In the deep learning method, the color density encoded diagrams 72r, 72g, and 72b (also referred to as third training data) and the fourth training data 73NC shown in FIG. 2 are used as the non-tumorous part training data 74NC. Specifically, the neural network 50 is caused to learn the color density encoded diagrams 72r, 72g, 72b as the input layer 50a and the fourth training data 73NC as the output layer 50b. That is, the neural network 50 learns the relationship between pairs of the color density encoded diagrams 72r, 72g, and 72b of the respective colors of R, G, and B and the fourth training data 73NC.

A method of generating the tumor site training data 74C will be described with reference to FIGS. 3A to 3C. The tumor site training data 74C are data obtained by combining the color density encoded diagrams 72r, 72g, and 72b of each of the R, G, B colors and the second training data 73C. In the tumor site training data 74C in FIG. 3A, the image size (size per single datum) are simplified for convenience of explanation, and the color density encoded diagrams 72r, 72g, and 72b and the second training data 73C are configured of 81 pixels in total of 9 pixels in the vertical direction and 9 pixels in the horizontal direction.

FIG. 3B shows an example of pixels configuring the tumor site training data 74C. Three values 74a shown in the upper part of FIG. 3B are density values of R, G, B in each pixel. Illustratively, the three values are stored in the order red (R), green (G) and blue (B). Each pixel of the color density encoded diagrams 72r, 72g, and 72b is shown in eight levels of color density values from value 0 to value 7. This is a process of converting the brightness of each color image 72R, 72G, 72B represented in 256 steps to the eight-step color density value, respectively, as an example of image preprocessing. For the color density value, for example, the lowest brightness (a gradation group having a low brightness value when represented by 256 RGB colors) is set as the color density value 0, and gradually higher values are assigned as the degree of brightness increases, with the highest brightness (gradation group having high brightness value when expressed in RGB color of 256 gradations) is set as color density value 7. The value 74b shown in the lower part of FIG. 3B is the label value of the second training data 73C. For example, the label value 1 indicates the cell nucleus of the tumor cell, and the label value 0 indicates the other region. That is, in the second training data 73C shown in FIG. 1, the position of the pixel with a label value that changes from 1 to 0 or the pixel changing from 0 to 1 is equivalent to the boundary between the nucleus region of the tumor cell and the other region.

The tumor site training data 75C shown in FIG. 3C are data obtained by cutting out a region (hereinafter referred to as "window size") of a predetermined number of pixels of the tumor site training data 74C shown in FIG. 3A. Although the window size of the tumor site training data 75C are simplified to 3×3 pixels for the sake of convenience of explanation, the actual preferable window size is illustratively about 113×113 pixels, and among them, a size of a 3×3 nuclei of normal gastric epithelial cells is preferable from the viewpoint of learning efficiency. For example, as shown in FIG. 3C, a window W1 of 3×3 pixels is set and the window W1 is moved relative to the tumor site training data 74C. The center of the window W1 is located at any pixel of the tumor site training data 74C, and, for example, the tumor site training data 74C in the window W1 indicated by the black frame is cut out as the tumor site training data 75C of the window size, tumor site training data 75C of the cut window size is used for learning of the neural network 50 shown in FIG. 1.

As shown in FIG. 1, the number of nodes of the input layer 50a of the neural network 50 is the number of pixels of the tumor site training data 75C of the input window size and the number of the primary colors included in the image (for example, three nodes: R, G, and B). The color density value data 76 of each pixel of the tumor site training data 75C of the window size is set as the input layer 50a of the neural network, and the label value 77 of the pixel positioned at the center of the label values 74b corresponding to the second training data 73C of each pixel of the tumor site training data 75C is learned by the neural network 50 as the output layer 50b of the neural network 50. The color density value data 76 of each pixel are aggregate data of the color density values 74a of each color of R, G, B of each pixel of the tumor site training data 75C. As an example, when the tumor site training data 75C of the window size is 3×3 pixels, one color density value 74a is given for each R, G, and B for each pixel, so that the color density value data 76, such that the number of color density values of the color density value data 76 is "27" (3×3×3=27) and the number of nodes of the input layer 50a of the neural network 50 also becomes "27".

In this way the tumor site training data 75C of the window size input to the neural network 50 can be automatically created by the computer without being created by the user. Efficient deep layer learning of the neural network 50 is promoted in this way.

Figure 5:
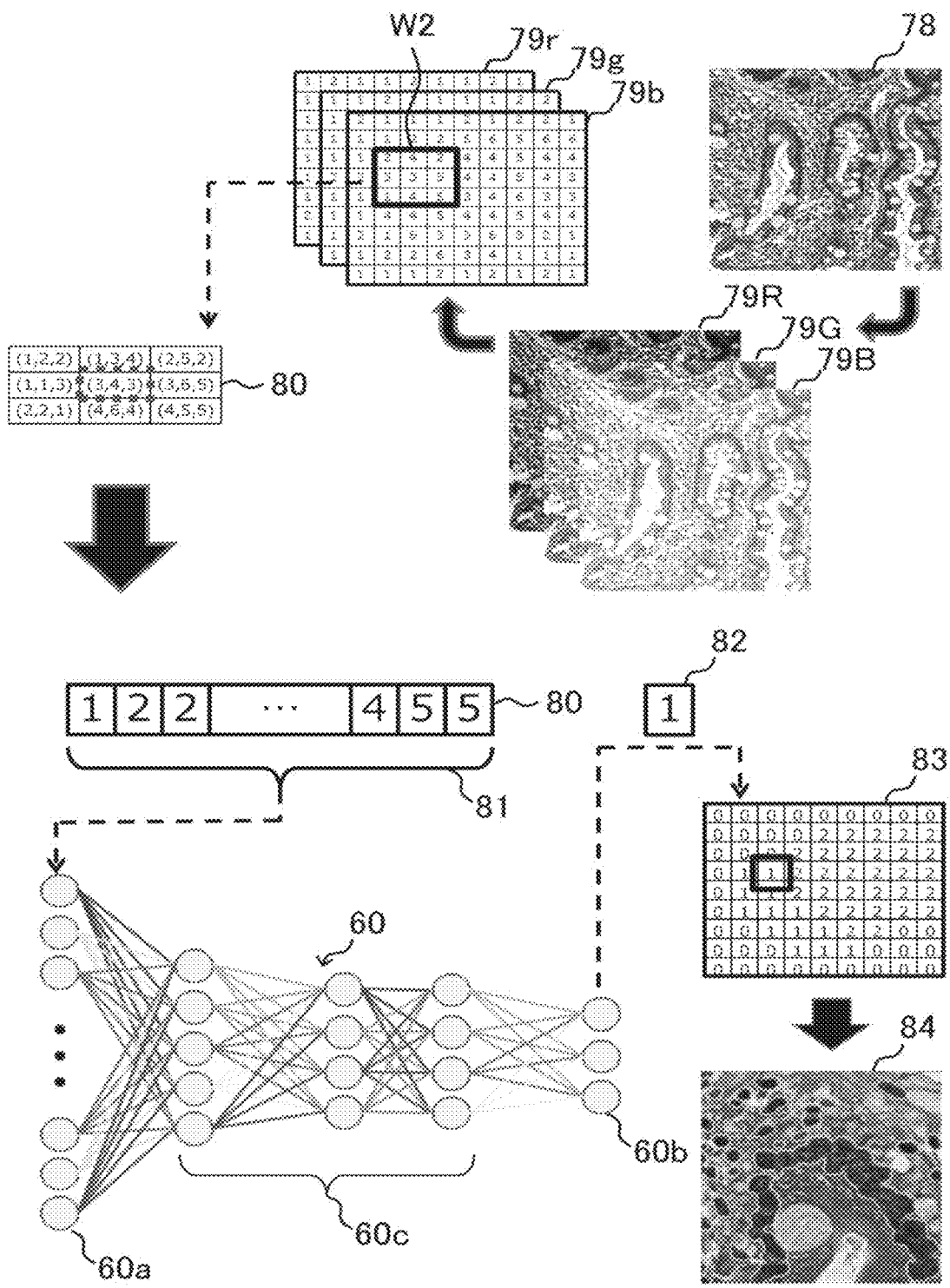
FIG. 5 is a schematic diagram illustrating the outline of an image analysis method.

As shown in FIG. 3C, in the initial state the center of the window W1 is located at the upper left corner of the tumor site training data 74C. Thereafter, the tumor site training data 75C of the window size is cut out of the window W1, and the position of the window W1 is moved each time learning of the neural network 50 is performed. More specifically, the window W1 is moved in units of one pixel so that the center of the window W1 scans all the pixels of the tumor site training data 74C, for example. In this way the tumor site training data 75C of the window size cut out from all the pixels of the tumor site training data 74C are used for learning by the neural network 50. Therefore, the degree of learning of the neural network 50 can be improved, and a deep learning algorithm having the structure of the neural network 60 shown in FIG. 5 is obtained as a result of deep learning.

FIG. 4 shows non-tumor site training data 74NC. The method of generating the non-tumor site training data 74NC is the same as the description in the tumor site training data 74C. However, in non-tumor site training data 74 NC. For example, the label value 2 indicates the nuclear region of the non-tumor cell, and the label value 0 indicates the other region. That is, in the fourth training data 73NC shown in FIG. 2, the position of the pixel with the label value changes from 2 to 0, or the pixel that changes from 0 to 2 corresponds to the boundary between the nucleus region of the non-tumor cell and the other region.

Together with the tumor site training data 74C and the non-tumor site training data 74NC, the label indicating the nuclear region of the tumor cell is 1, the label indicating the nuclear region of the non-tumor cell is 2, the label indicating the part which is neither the nuclear region of the tumor cell nor the nucleus region of the non-tumor cell is ternary data of 0.

Image Analysis Method Summary

In the image analysis method shown in FIG. 5, analysis data 80 are generated from an analysis target image (bright field image) 78 obtained by imaging a sample including a tissue or cells to be analyzed. The sample preferably is stained the same as the first training image. The analysis target image 78 also can be acquired as a color image, for example, using a known microscope, a virtual slide scanner or the like, for example. The analysis target image (bright field image) 78 may be an image including one or more primary colors. When color analysis target image 78 is encoded with color density values of each color of R, G, and B for each pixel, it is possible to express the entire image as an encoded diagram of color density values in each pixel for each of R, G, B (analysis color density encoded diagrams 79r, 79g, 79b). Color density encoded diagrams 79r, 79g, and 79b showing the codes of the color densities in the single color image of each color of R, G, and B shown in the example of FIG. 5 are obtained by substituting the three primary colors of images 79R, 79G, 79B with color density values represented by codes displayed in eight levels from 0 to 7.

The analysis data 80 are data obtained by cutting out regions (that is, window sizes) having a predetermined number of pixels of the color density encoded diagrams 79r, 79g, and 79b, and the data of the tissue or cell included in the analysis target image 78 include color density values. Although the data 80 for analyzing the window size is simplified to 3×3 pixels for convenience of explanation similar to the tumor site training data 75C and the non-tumor site training data 75NC, a preferable window size is, for example, about 113×113 pixels, and a size of a 3×3 nucleus of normal gastric epithelial cells is preferable in view of discrimination accuracy, for example, a field of view of 40 times which is about 113×113 pixels. For example, a window W2 of 3×3 pixels is set, and the window W2 is moved relative to the color density encoded diagrams 79r, 79g, and 79b. The center of the window W2 is located at any pixel of the color density encoded diagrams 79r, 79g, 79b, and the color density encoded diagrams 79r, 79g, 79b are displayed in a window W2 indicated by a black frame of 3×3 pixels to obtain window size analysis data 80. In this way the analysis data 80 are generated for each area including peripheral pixels around the predetermined pixel from the color density encoded diagrams 79r, 79g, and 79b. The predetermined pixel means the pixel of the color density encoded diagrams 79r, 79g, and 79b located at the center of the window W2, and the peripheral pixels are pixels within the window size range centered on the predetermined pixel of color density encoded diagrams 79r, 79g, 79b. Similarly to the tumor site training data 74C and the non-tumor site training data 74NC, the color density values are stored in the order of red (R), green (G) and blue (B).

In the image analysis method, the analysis data 80 are processed using the deep learning algorithm 60 having a learned neural network created using the tumor site training data 75C and the non-tumor site training data 75NC of the window size shown in FIGS. 1 and 2. Data 83 indicating the tumorigenic state in the tissue or cell to be analyzed are generated by processing the analysis data 80.

Referring again to FIG. 5, the analysis data 80 cut out from the color density encoding diagrams 79r, 79g, and 79b of the respective colors R, G, and B are input to the neural network 60 configuring the deep learning algorithm. The number of nodes of the input layer 60a of the neural network 60 corresponds to the product of the number of input pixels and the number of primary colors included in the image. When the color density value data 81 of each pixel of the analysis data 80 is input to the neural network 60, the estimated value 82 (three values) of the pixel located at the center of the analysis data 80 is output from the output layer 60b. For example, an estimated value is 1 indicates that the pixel is a nuclear region of a tumor cell, and an estimated value is 2 indicates that the pixel is a nuclear region of a non-tumor cell that is not a nuclear region of a tumor cell, an estimated value of 0 means that the pixel is a region other than the cell nucleus. That is, the estimated values 82 output from the output layer 60b of the neural network 60 are data generated for each pixel of the analysis target image and are data indicating the tumorigenic state of the cells in the analysis target image. The estimated value 82 indicates that it is a nuclear region of a tumor cell, that it is a nuclear region of a non-tumor cell, and that it is a region other than a cell nucleus in three values, for example, it is distinguished by three values of value 1, value 2, and value 0. The estimate value 82 is also called a label value and is also called a class in the description of the neural network in the following description. The neural network 60 generates a label indicating the tumorigenic state of the cell relative to the pixel located at the center of the analysis data 80 of the input analysis data 80. In other words, the neural network 60 classifies the analysis data 80 into classes indicating tumorigenic states of tissues or cells contained in the analysis target image. The color density value data 81 of each pixel is aggregate data of the color density values of each color of R, G, B of each pixel of the analysis data 80.

Thereafter, the analysis data 80 are extract by window size while moving the window W2 by one pixel unit so that the center of the window W2 scans all pixels of the color density encoded diagrams 79r, 79g, and 79b of the respective colors R, G, B. The extracted analysis data 80 are input to the neural network 60. In this way a label value 83 is obtained as data indicating the tumorigenic state of the tissue or cell in the analysis target image. As shown in the example in FIG. 5, the label value 83 also is subjected to a tumor cell nucleus region detection process to obtain a tumor cell nucleus region weighted image 84 indicating a region of the tumor cell nucleus. Specifically, the tumor cell nucleus region detection process is, for example, a process of detecting a pixel whose estimated value 82 is a value 1, and is a process of actually identifying the region of the tumor cell nucleus. The tumor cell nucleus region emphasized image 84 is an image in which the region of the cell nucleus obtained by the image analysis process is displayed superimposed on the analysis target image 78. After discriminating the region of the tumor cell nucleus, a process also may be performed to display the tumor cell nucleus and the other region (other than the non-tumor cell nucleus or cell nucleus) discriminately on the display device. For example, processing is performed such as filling the region of the tumor cell nucleus with color, drawing a line between the region of the tumor cell nucleus and the other region ad the like so as to be distinguishably displayed on the display device.

First Embodiment

Figure 6:
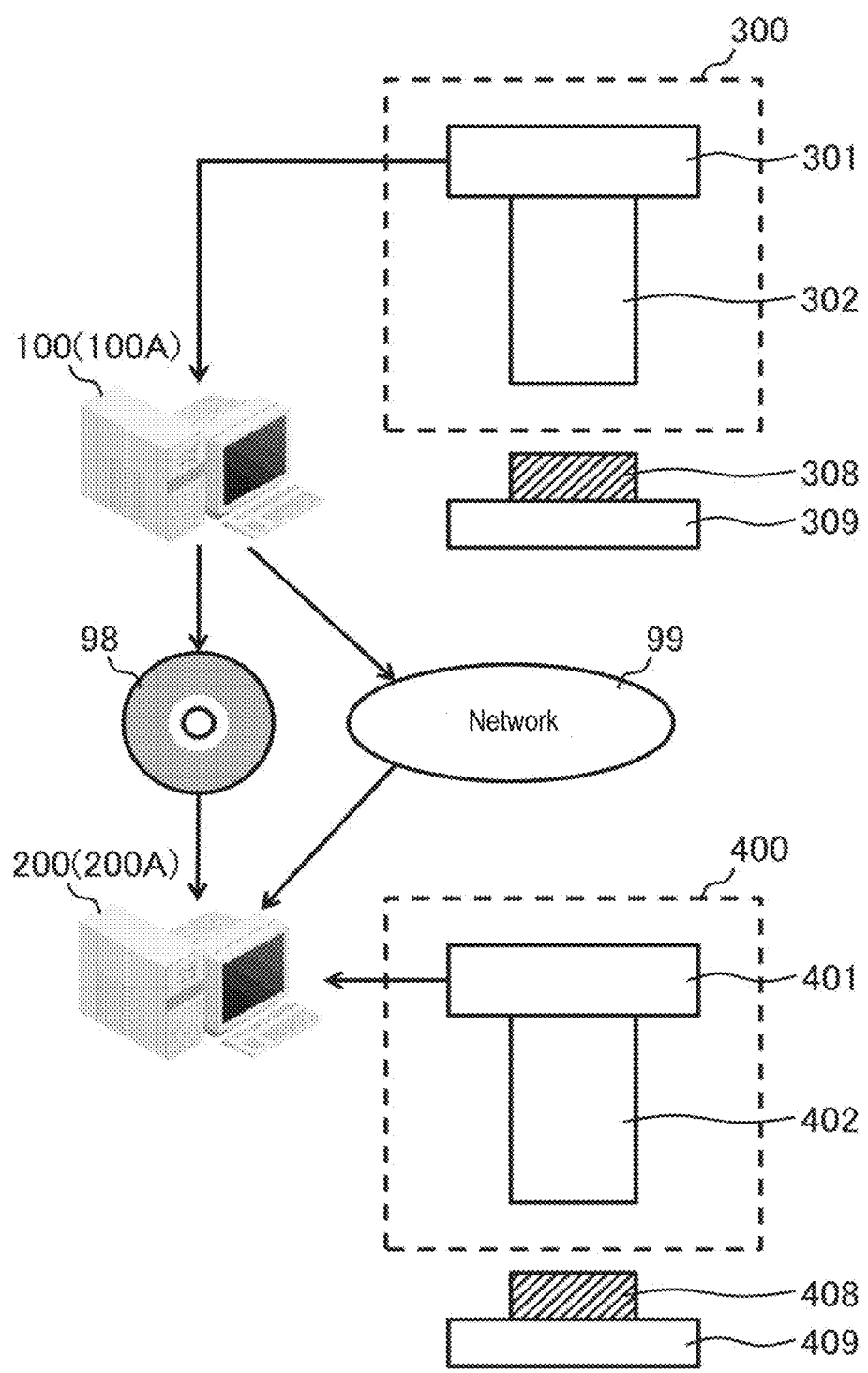
FIG. 6 is a schematic structural diagram of an image analysis system according to a first embodiment.

In the first embodiment, the configuration of a system that implements the deep learning method and image analysis method described in the above outline will be specifically described.
Structure Summary Referring to FIG. 6, the image analysis system according to the first embodiment includes a deep learning apparatus 100A and an image analysis apparatus 200A. The vendor side apparatus 100 operates as the deep layer learning apparatus 100A and the user side apparatus 200 operates as the image analysis apparatus 200A. The deep learning apparatus 100A learns using the training data in the neural network 50 and provides the user with a deep learning algorithm 60 that is trained with the training data. The deep learning algorithm configured by the learned neural network 60 is provided from the deep learning apparatus 100A to the image analysis apparatus 200A through a recording medium 98 or a network 99. The image analysis apparatus 200A analyzes an analysis target image using a deep learning algorithm configured by the learned neural network 60.

The deep layer learning apparatus 100A is configured by, for example, a general-purpose computer, and performs a deep learning process based on a flowchart to be described later. The image analysis apparatus 200A is configured by, for example, a general-purpose computer, and performs image analysis processing based on a flowchart to be described later. The recording medium 98 is a computer readable non-transitory tangible recording medium such as a DVD-ROM or a USB memory.

The deep learning apparatus 100A is connected to an imaging device 300. The imaging device 300 includes an imaging element 301 and a fluorescence microscope 302, and captures bright field images and fluorescence images of a learning sample 308 set on a stage 309. The learning sample 308 is subjected to the staining described above. The deep learning apparatus 100A acquires the first training image 70 and the second training image 71 captured by the imaging device 300.

The image analysis apparatus 200A is connected to the imaging device 400. The imaging device 400 includes an imaging element 401 and a fluorescence microscope 402, and captures a bright field image of an analysis target sample 408 set on the stage 409. The analysis target sample 408 is stained in advance as described above. The image analysis apparatus 200A acquires the analysis target image 78 captured by the imaging device 400.

A known fluorescence microscope, a virtual slide scanner or the like having a function of imaging a sample can be used as the imaging devices 300 and 400. The imaging device 400 also may be an optical microscope insofar as it has a function of imaging a sample.
Hardware Structure Referring to FIG. 7, the vendor side apparatus 100 (100A, 100B) includes processing units 10 (10A, 10B), an input unit 16, and an output unit 17.

The processing unit 10 includes a CPU (Central Processing Unit) 11 that performs data processing to be described later, a memory 12 used as a work area for data processing, a recording unit 13 that records programs and processing data described later, a bus 14 for transmitting data, an interface unit 15 for inputting and outputting data with an external device, and a GPU (Graphics Processing Unit) 19. The input unit 16 and the output unit 17 are connected to the processing unit 10. Illustratively, the input unit 16 is an input device such as a keyboard or a mouse, and the output unit 17 is a display device such as a liquid crystal display. The GPU 19 functions as an accelerator for assisting arithmetic processing (for example, parallel arithmetic processing) performed by the CPU 11. That is, the process performed by the CPU 11 in the following description means that the process includes a process performed by the CPU 11 using the GPU 19 as an accelerator.

In order to perform the process of each step described below with reference to FIG. 10, the processing unit 10 pre-records the program and the neural network 50 of the present invention in the recording unit 13 before learning, for example, in an executable form. The execution form is, for example, a form generated by being converted from a programming language by a compiler. The processing unit 10 performs processing using the program recorded in the recording unit 13 and the neural network 50 before learning.

Unless otherwise specified in the following description, processing performed by the processing unit 10 means processing performed by the CPU 11 based on the program stored in the recording unit 13 or the memory 12 and the neural network 50. The CPU 11 temporarily stores necessary data (such as intermediate data being processed) with the memory 12 as a work area, and appropriately records data for long term storage, such as calculation results, in the recording unit 13.

Figure 8:
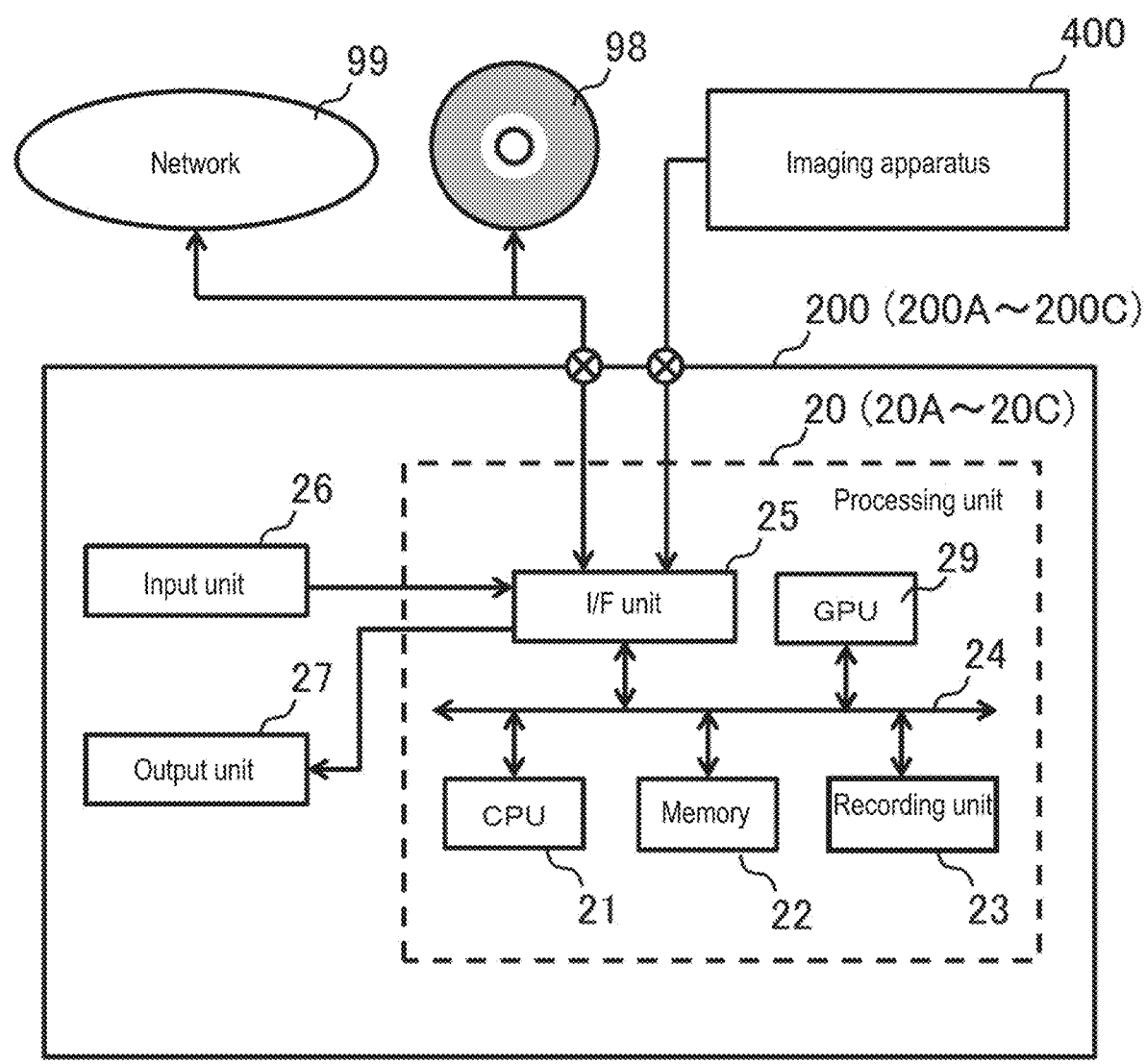
FIG. 8 is a block diagram showing a hardware configuration of a user side apparatus 200.

Referring to FIG. 8, the user side apparatus 200 (200A, 200B, 200C) includes a processing unit 20 (20A, 20B, 20C), an input unit 26, and an output unit 27.

The processing unit 20 includes a CPU (Central Processing Unit) 21 for performing data processing to be described later, a memory 22 used as a work area for data processing, a recording unit 23 for recording programs and processing data described later, a bus 24 for transmitting data, an interface section 25 for inputting and outputting data with an external device, and a GPU (Graphics Processing Unit) 29. The input unit 26 and the output unit 27 are connected to the processing unit 20. Illustratively, the input unit 26 is an input device such as a keyboard or a mouse, and the output unit 27 is a display device such as a liquid crystal display. The GPU 29 functions as an accelerator for assisting arithmetic processing (for example, parallel arithmetic processing) performed by the CPU 21. That is, the process performed by the CPU 21 in the following description means that the process includes a process performed by the CPU 21 using the GPU 29 as an accelerator.

In order to perform the processing of each step described below with reference to FIG. 13, the processing unit 20 records in advance the program according to the present invention and the learned neural network structure deep layer learning algorithm 60, for example, in an executable format in the recording unit 23. The execution form is, for example, a form generated by being converted from a programming language by a compiler. The processing unit 20 performs processing using the program recorded in the recording unit 23 and the deep learning algorithm 60.

Unless otherwise stated in the following description, the processing performed by the processing unit 20 means the processing actually performed by the processing unit 20 based on the program stored in the recording unit 23 or the memory 22 and the deep learning algorithm 60. The CPU 21 temporarily stores necessary data (such as intermediate data being processed) with the memory 22 as a work area, and appropriately records data for long term storage, such as calculation results, in the recording unit 23.

Function Block and Processing Procedure

Deep Learning Process

Figure 9:
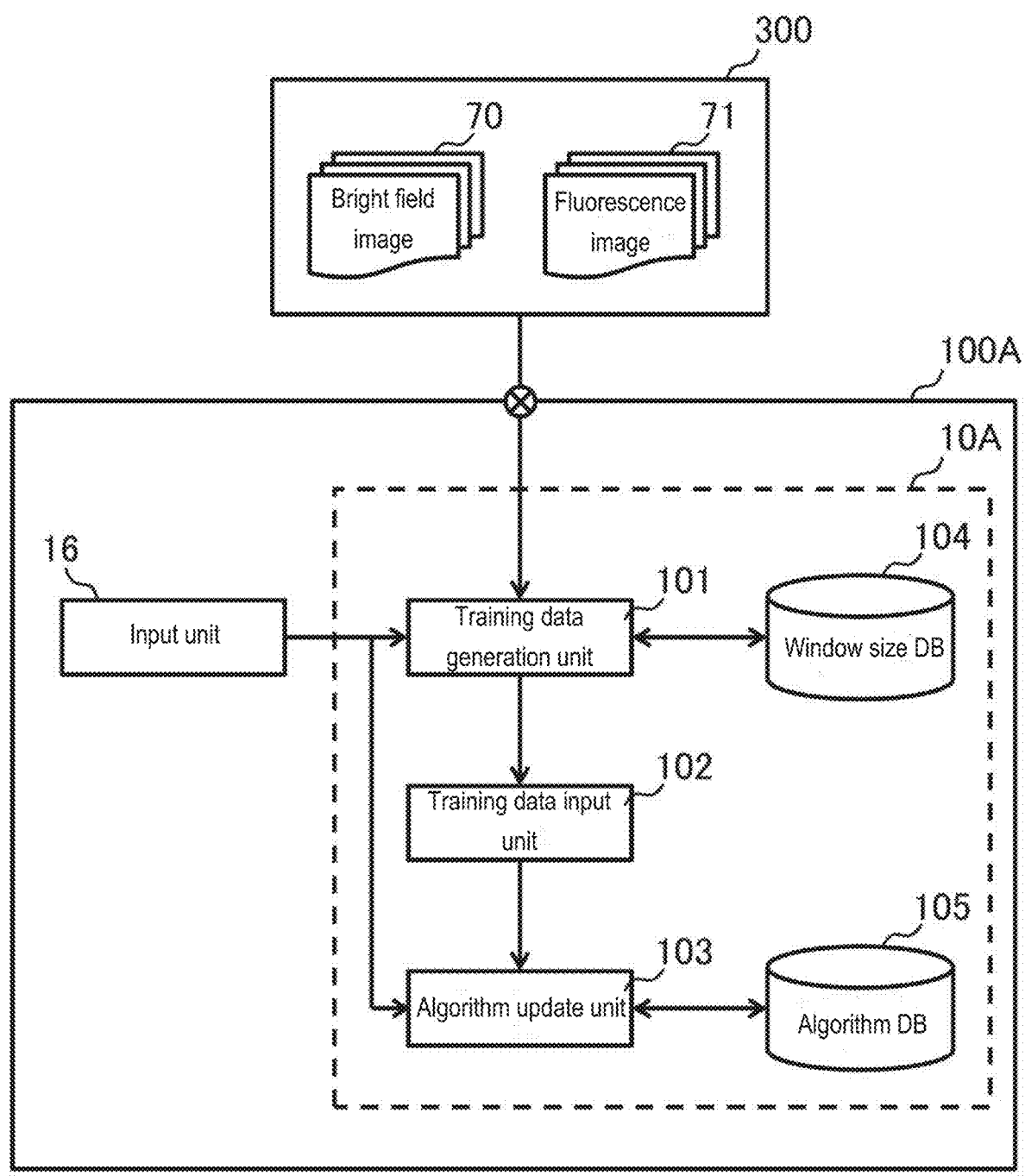
FIG. 9 is a block diagram illustrating the functions of the deep learning apparatus 100A according to the first embodiment.

Referring to FIG. 9, the processing unit 10A of the deep learning apparatus 100A according to the first embodiment includes a training data generating unit 101, a training data input unit 102, and an algorithm updating unit 103. These functional blocks are realized by installing a program that causes a computer to execute a deep layer learning process in the recording unit 13 or the memory 12 of the processing unit 10A and executing this program by the CPU 11. The window size database 104 and the algorithm database 105 are recorded in the recording unit 13 or the memory 12 of the processing unit 10A.

The first training image 70C, the second training image 71C, the third training image 70NC, and the fourth training image 71NC of the sample for learning are captured in advance by the imaging device 300, and the image is stored in advance in the recording unit 13 or the memory 12 of the processing unit 10A. The neural network 50 is stored in advance in the algorithm database 105 in association with, for example, the type (for example, organization name) of the tissue sample from which the analysis target sample is derived or the type of sample including cells.

Figure 10:
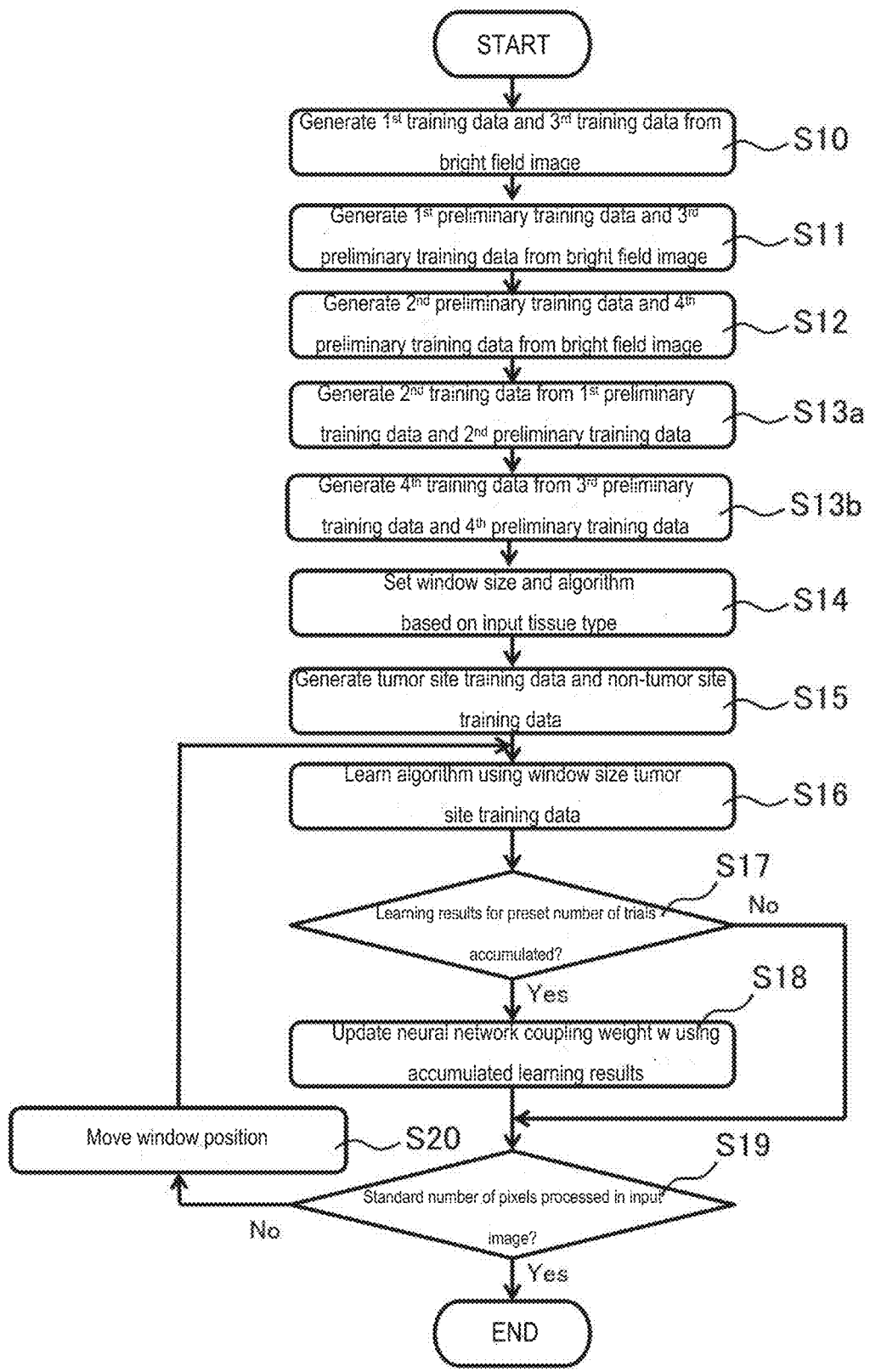
FIG. 10 is a flowchart showing a procedure of a deep learning process.

The processing unit 10A of the deep learning apparatus 100A performs the process shown in FIG. 10. When describing each function block shown in FIG. 9, the processes of steps S10 to S14, S19 and S20 are performed by the training data generating unit 101. The process of step S15 is performed by the training data input unit 102. The processes of steps S16 to S18 are performed by the algorithm updating unit 103.

In steps S10 to S20 described below, a deep learning process is described relative to a pair of a first training image 70C and a second training image 71C and a pair of a third training image 70NC and a fourth training image 71NC. The pair of the first training image 70C and the second training image 71C are training images for learning whether the pixel of interest is a cell nucleus region, a cell nucleus of a tumor cell, or a non-nuclear cell region. The pair of the third training image 70NC and the fourth training image 71NC are a training images for learning whether the pixel of interest is a cell nucleus region, a cell nucleus of a non-tumor cell, or a non-nuclear cell region.

In step S10, the processing unit 10A generates color density encoded diagrams 72$r$, 72$g$, and 72$b$ for R, G, B colors from the input first training image 70C. The color density encoded diagrams 72$r$, 72$g$, and 72$b$ are created by stepwise expression of the color density values of the respective colors of R, G, and B of each pixel of the first training image 70C. In the present embodiment, color density encoding diagrams 72$r$, 72$g$, and 72$b$ are created for each R, G, B gradation image with the color density value set to 8 levels from 0 to 7. Assignment of a color density value is carried out, for example, by setting the lowest brightness as the color density value 0, gradually assigning a higher value as the degree of brightness increases, and setting the highest brightness as the color density value 7.

In step S11, the processing unit 10A generates first preliminary training data 70CL indicating a region of the tissue of the learning target tissue in the first training image 70C. The first preliminary training data 70CL are used to generate ternary second training data 73C to be described later. The first preliminary training data 70CL include a label value indicating that it contains a region of tumor cells.

For example, the processing unit 10A displays on the output unit 17 an image (a whole slide image 70W) of a wide area including the area of the first training image 70C. The pathologist making the determination visually confirms the image of the whole slide image 70W displayed on the output unit 17. The pathologist specifies the region in the whole slide image 70W determined to contain the tumor cells via, for example, the input unit 16, and fills in the whole slide image 70W with a solid line such as red, for example. The area surrounded by the red solid line in the whole slide image is the area judged by the pathologist to contain tumor cells. Likewise, the pathologist enters a solid line such as blue different from red for the area in the whole slide image 70W determined to contain no tumor cells in the first training image 70C. The area surrounded by the blue solid line in the whole slide image 70W is an area determined by a pathologist not to contain tumor cells. Instead of having the whole slide image 70W displayed on the output unit 17 and asking the pathologist to make a determination, the processing unit 10A acquires the whole slide image 70W determined by the pathologist via the I/F unit 15 or the network 99.

For each pixel of the bright field image acquired from the area surrounded by the red solid line in the whole slide image 70W, the processing unit 10 A sets, for example, a value "1" as a label value indicating that it is a tumor area. Thereafter, the processing unit 10A extracts an area corresponding to the area of the first training image 70C from among the whole slide images determined by the pathologist, thereby obtaining the first preliminary training data 70CL indicating the tumorigenic state of the learning target tissue. For example, a value "2" is assigned to each pixel of the bright-field image acquired from the area surrounded by the solid blue line as a label value indicating that it is a non-tumor area. Thereafter, the processing unit 10A extracts an area corresponding to the area of the third training image 70NC from among the whole slide images determined by the pathologist, and generates third preliminary training data 70NCL indicating the tumorigenic state of the learning target tissue.

Note that in the whole slide image in which the determination result of the pathologist is indicated by the solid lines of red and blue, the region surrounded by red and the region surrounded by blue are not overlapped and are shown as regions distinguished from each other. A region containing tumor cells and a region not containing tumor cells are adjacent to each other, and the region surrounded by red and the region surrounded by blue may be adjacent to each other.

In step S12, the processing unit 10A binarizes the gradation of each pixel of the input second training image 71C and generates second preliminary training data 71CN indicating the cell nucleus region of the learning target tissue. The second preliminary training data 71CN indicating the cell nucleus region are used to generate ternary second training data 73C to be described later. The binarization process is performed, for example, by comparing the gradation of each pixel in the image with a predetermined threshold value. Instead of comparing with the threshold value, gradation may be binarized using the maximum likelihood estimation method.

In step S13a, the processing unit 10A generates the second training data 73C from the first preliminary training data 70CL and the second preliminary training data 71CN. The second training data 73C (ternarized image) is used for generating the tumor site training data 74C to be learned as correct in the neural network 50. That is, the processing unit 10A gives, for each pixel, a label value indicating the nuclear region of tumor cell and a label value indicating a region other than a cell nuclear region based on the label value indicating a tumor cell and a label value indicating a region other than a cell nuclear region to the pixel of the first preliminary training data 70CL and the pixel at the same position corresponding to the second preliminary training data 71CN. The processing unit 10A generates such second training data 73C by performing such a determination process for each pixel for all the pixels included in the first preliminary training data 70CL and the second preliminary training data 71CN.

As an example of the determination for each pixel, the processing unit 10A determines, as the label value of the tumorigenic state of the cell to be given for each pixel in the second training data 73C, for example, label values of the values "1" and "0". For example, a value "1" is assigned to a pixel corresponding to a cell nucleus of a tumor cell, and a value "0" is assigned to a pixel that is not a region of the cell nucleus.

For example, if the value of the pixel of interest of the second preliminary training data 71CN indicating the cell nuclear region is a label value indicating the region of the cell nucleus, the processing unit 10A further references the label value of the pixel of interest of the first preliminary training data 70CL indicating the tumorigenic state, and assigns the label value of the reference pixel of interest as a label value indicating the tumorigenic state of the target pixel of the second training data 73C. If the value of the referenced pixel is, for example, a value "1" indicating that it is a region of a tumor cell, the processing unit 10A assigns a value "1" to the pixel of interest of the second training data 73C. On the other hand, if the value of the target pixel of the second preliminary training data 71CN indicating the cell nucleus region is a value indicating a region other than the cell nucleus, the processing section 10A assigns a value "0" to the pixel of interest of the second training data 73C without referencing the label value of the pixel of interest of the first preliminary training data 70CL.

In step S13b, the processing unit 10A generates the fourth training data 73NC from the third preliminary training data 70NCL and the fourth preliminary training data 71NCN. The fourth training data 73NC is used to generate the non-tumor site training data 74NC to be learned as correct by the neural network 50. That is, the processing unit 10A gives, for each pixel, a label value indicating the pixel is a nuclear region of the tumor cell and a label value indicating other region based on the label value indicating a non-tumor cell and a label value indicating a region other than a cell nuclear region to the pixel of the first preliminary training data 70CL and the pixel at the same position corresponding to the second preliminary training data 71CN. The processing unit 10A generates a fourth training data 73NC by performing the determination process for each pixel included in the third preliminary training data 70NCL and the fourth preliminary training data 71NCN.

As an example of the determination for each pixel, the processing unit 10A assigns, for example, label values of values "2" and "0" as a label value indicating the tumorigenic state of a cell given for each pixel in the fourth training data 73NC. For example, a value "2" is assigned to a pixel corresponding to a cell nucleus of a non-tumor cell, and a value "0" is assigned to a pixel that is not a region of the cell nucleus.

For example, if the value of the pixel of interest of the fourth preliminary training data 71NCN indicating the cell nuclear region is a label value indicating the region of the cell nucleus, the processing unit 10A further references the label value of the pixel of interest of the third preliminary training data 70NCL indicating the tumorigenic state, and assigns the label value of the reference pixel of interest as a label value indicating the tumorigenic state of the target pixel of the fourth training data 73NC. If the value of the referred pixel is, for example, a value "2" indicating that it is a region of a non-tumor cell, the processing unit 10A assigns the value "2" to the pixel of interest of the second training data 73C. On the other hand, if the value of the pixel of interest of the fourth preliminary training data 71NCN indicating the cell nuclear region is a value indicating a region other than the cell nucleus, the processing section 10A assigns a value "0" to the pixel of interest as the label value indicating the tumorigenic state of the pixel of interest of the fourth preliminary training data 73NC without referring to the label value of the pixel of interest of the third preliminary training data 70NCL.

In step S14, the processing unit 10A receives input of the type of tissue for learning from the operator on the side of the deep learning apparatus 100A via the input unit 16. The processing unit 10A sets the window size by referring to the window size database 104 based on the type of the input tissue and refers to the algorithm database 105 to set the neural network 50 used for learning. In the present embodiment in which a stomach tissue sample analysis target, the window size is, for example, 113×113 pixels. This pixel size is a size in an image captured at, for example, 40 times magnification. Exemplarily, it is a size that supports that the entire shape of the cell nucleus region of at least one cell out of two to nine cells is included in the window. The window size is a unit of training data to be input to the neural network 50 at the time of one input, and the product of the number of pixels of the tumor site training data 75C of the window size and the number of the primary colors included in the image corresponds to the number of nodes of the input layer 50a. The window size is associated with the type of the tissue sample or the type of the sample including cells and recorded in advance in the window size database 104.

In step S15, the processing unit 10A generates tumor site training data 75C of the window size from the first training data and the second training data 73C which are the color density encoded diagrams 72r, 72g, and 72b. Specifically, as described above with reference to FIGS. 3A to 3C, in the "Summary of the Deep Learning Method" described above, the tumor site training data 75C of the window size by the window W1 is prepared from the tumor site training data 74C that combines the first training data and the second training data 73C. The processing unit 10A also generates window size non-tumor site training data 75NC from the third training data and the fourth training data 73C which are the color density encoding diagrams 72r, 72g, and 72b. Specifically, as described above with reference to FIGS. 3A to 3C, in the "Summary of the Deep Learning Method" described above, the non-tumor site training data 75NC of the window size by the window W1 are prepared from the non-tumor site training data 74NC that combines the third training data and the fourth training data 75C.

In step S16 shown in FIG. 10, the processing unit 10A causes the neural network 50 to learn using the tumor site training data 75C and the non-tumor site training data 75NC of the window size. The learned result of the neural network 50 is accumulated each time the neural network 50 learns using the tumor site training data 75C and the non-tumor site training data 75NC of the window size.

In the image analysis method according to the embodiment, since a convolutional neural network is used and the stochastic gradient descent method is used, in step S17, the processing unit 10A determines whether learning results for a predetermined number of trials are accumulated. The processing unit 10A performs the processing of step S18 when the learning results are accumulated for a predetermined number of trials, and the processing unit 10A performs the processing of step S19 when the learning results are not accumulated for a predetermined number of trials.

When learning results have been accumulated for a predetermined number of trials, in step S18 the processing unit 10A updates the coupling weight w of the neural network 50 using the learning results accumulated in step S16. In the image analysis method according to the embodiment, since the stochastic gradient descent method is used, the coupling weight w of the neural network 50 is updated when the learning results for a predetermined number of trials are accumulated. Specifically, the process of updating the coupling weight w is a process of performing calculation by the gradient descent method shown in (Equation 11) and (Equation 12) described later.

In step S19, the processing unit 10A determines whether the specified number of pixels in the input image have been processed. The input image is the tumor site training data 74C and the non-tumor site training data 75NC, and when a series of processes from step S16 to step S18 have been performed for the prescribed number of pixels in the tumor site training data 74C and the non-tumor site training data 75NC, the deep learning process is terminated. Learning by the neural network does not necessarily have to be performed for all pixels in the input image, and the processing unit 10A can perform learning by processing a part of pixels in the input image, that is, a prescribed number of pixels. The prescribed number of pixels also may be all pixels in the input image.

In the case where the specified number of pixels in the input image are not processed, in step S20 the processing unit 10A moves the center position of the window by one pixel unit in the tumor site training data 74C and the non-tumor site training data 75NC. Thereafter, the processing unit 10A performs a series of processes from step S16 to step S18 at the new window position after movement. That is, in step S15 the processing unit 10A extracts the tumor area training data 74C or the non-tumor area training data 75NC at the new window position after the movement at the window size. Subsequently, in step S16 the processing unit 10A causes the neural network 50 to learn using the tumor site training data 75C and the non-tumor site training data 75NC of the newly cut window size. When learning results for a predetermined number of trials are accumulated in step S17, the processing unit 10A updates the coupling weight w of the neural network 50 in step S18. Learning by the neural network 50 for each window size is performed for a specified number of pixels in the tumor site training data 74C and the non-tumor site training data 75NC.

The degree of learning of the neural network 50 is improved by repeating the deep learning processes of steps S10 to S20 for a pair of input image relative to a plurality of pairs of different input images. In this way a deep learning algorithm 60 of the neural network structure shown in FIG. 5 is obtained.

Neural Network Structure

Figure 11A:
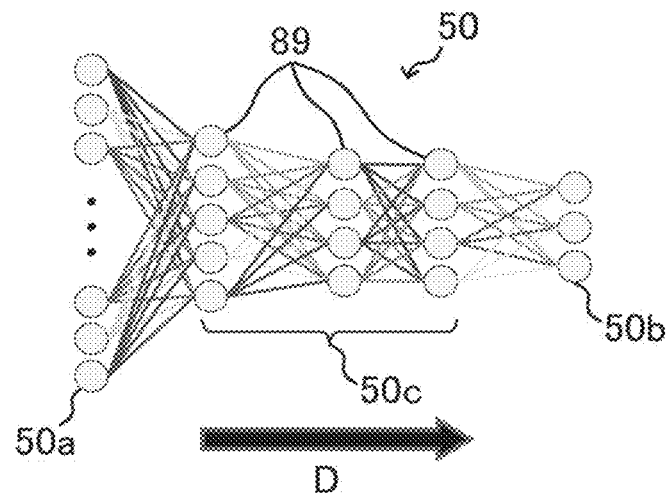
FIGS. 11A-11C are schematic diagrams describing details of learning by a neural network.

In the first embodiment shown in FIG. 11A, a neural network of a deep learning type is used. The neural network of the deep learning type is configured by an input layer 50a, an output layer 50b, and an intermediate layer 50c between the input layer 50a and the output layer 50b, and the intermediate layer 50c is configured by a plurality of layers as in the neural network shown in FIG. 11A. The number of layers configuring the intermediate layer 50c, for example, may be five or more.

In the neural network 50, a plurality of nodes 89 arranged in layers are connected between layers. In this way information propagates from the input side layer 50a to the output side layer 50b only in one direction indicated by an arrow D in the drawing. In the present embodiment, the number of nodes of the input layer 50a corresponds to the product of the number of pixels of the input image, that is, the number of pixels of the window W1 shown in FIG. 3C and the number of primary colors included in each pixel. Since the pixel data (color density values) of the image can be input to the input layer 50a, the user can input the input image to the input layer 50a without separately calculating the feature amount from the input image.

Operation at Each Node

Figure 11B:
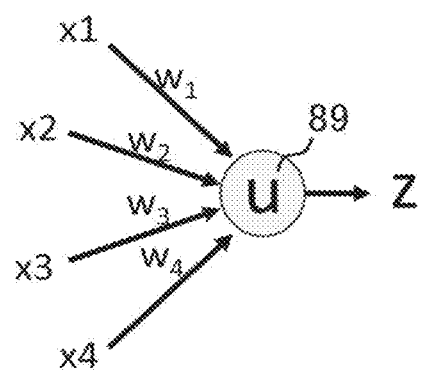

FIG. 11B is a schematic diagram showing the operation at each node. Each node 89 receives a plurality of inputs and calculates one output (z). In the example shown in FIG. 11B, the node 89 receives four inputs. The total input (u) received by the node 89 is expressed by the following (Equation 1).

Function 1

$$u = w_1 x_1 + w_2 x_2 + w_3 x_3 + w_4 x_4 + b$$

(式 1)

Each input is multiplied by a different weight. In equation (1), b is a value called bias. The output (z) of the node is an output of a predetermined function f relative to the total input (u) represented by (Equation 1), and is expressed by the following (Equation 2). The function f is called an activation function.
Function 1

$$z = f(u) \quad (式 2)$$

Figure 11C:
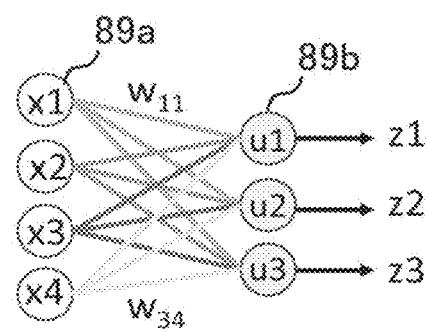

FIG. 11C is a schematic diagram showing the operation between the nodes. In the neural network 50, the nodes that output the result (z) represented by (Equation 2) are arranged in a layered manner relative to the total input (u) represented by (Equation 1). The output of the node of the previous layer becomes the input of the node of the next layer. In the example shown in FIG. 11C, the output of the node 89a on the layer on the left side in the figure becomes the input to the node 89b on the layer on the right side in the figure. Each node 89b of the right side layer receives an output from a node 89a on the left side layer, respectively. Different weights are applied to each coupling between each node 89a on the left side layer and each node 89b on the right side layer. Output of each of the plurality of nodes 89a on the left side layer is designated $x_1$~$X_4$, The inputs to each of the three nodes 89b on the right side layer are represented by the following (Equation 3-1) to (Equation 3-3).
Function 3

$$u_1 = w_{11}x_1 + w_{12}x_2 + w_{13}x_3 + w_{14}x_4 + b_1 \quad (式 3\text{-}1)$$

$$u_2 = w_{21}x_1 + w_{22}x_2 + w_{23}x_3 + w_{24}x_4 + b_2 \quad (式 3\text{-}2)$$

$$u_3 = w_{31}x_1 + w_{32}x_2 + w_{33}x_3 + w_{34}x_4 + b_3 \quad (式 3\text{-}3)$$

Generalizing these (Equation 3-1) to (Equation 3-3) results in (Equation 3-4). Here, i=1, . . . I, j=1, . . . J.
Function 4

$$u_j = \Sigma_{i=1}^{I} w_{ji} x_i + b_j \quad (式 3\text{-}4)$$

Applying Equation 3-4 to the activation function yields the output. The output is expressed by the following (Equation 4).
Function 4

$$z_j = f(u_j) \ (j=1,2,3) \quad (式 4)$$

Activation Function

In the image analysis method according to the embodiment, a rectified linear unit function is used as the activation function. The rectified linear unit function is expressed by the following (Equation 5).
Function 6

$$f(u) = \max(u, 0) \quad (式 5)$$

Equation 5 is a function that sets u=0 among u=0 in the linear function of z=u. In the example shown in FIG. 11C, the output of the node with j=1 is expressed by the following equation according to Equation 5.
Function 7

$$z_1 = \max((w_{11}x_1 + w_{12}x_2 + w_{13}x_3 + w_{14}x_4 + b_1), 0)$$

Neural Network Learning

Let y (x: w) be the function expressed using the neural network, the function y (x: w) changes as the parameter w of the neural network changes. Adjusting the function y (x: w) so that the neural network selects a more suitable parameter w for the input x is referred to as learning of the neural network. Suppose that multiple sets of inputs and outputs of functions expressed using a neural network are given. Assuming that the desired output for an input x is d, the input/output pair is $\{(x_1, D_1), (x_2, D_2), (x_n, D_n)\}$. The set of each set represented by (x, d) is referred to as training data. Specifically, the set of a set of a color density values for each pixel and a label for a true value image in a single color image of each color of R, G, B shown in FIG. 3B is the training data shown in FIG. 3A.

Learning by a neural network means that when input xn is given to any input/output pair (n, dn), weight w is adjusted so that the output y (xn: w) of the neural network is as close as possible to the output dn. An error function is a measure for measuring the proximity between a function expressed using a neural network and training data. Function 8

$$y(x_n : w) \approx d_n,$$

The error function is also referred to as a loss function. The error function E(w) used in the image analysis method according to the embodiment is represented by the following (Equation 6). Equation 6 is referred to as cross entropy.
Function 9

$$E(w) = -\Sigma_{n=1}^{N} \Sigma_{k=1}^{K} d_{nk} \log y_k(x_n; w) \quad (式 6)$$

A method of calculating the cross entropy of (Equation 6) will be described. In the output layer 50b of the neural network 50 used in the image analysis method according to the embodiment, that is, in the final layer of the neural network, an activation function is used for classifying the input x into a finite number of classes according to the content. The activation function is called a softmax function and is expressed below (Equation 7). Note that it is assumed that the same number of nodes as the class number k are arranged in the output layer 50b. The total input u of each node k (k=1, . . . , K) of the output layer L is obtained from the output of the previous layer L−1 by $u_{k(L)}$ respectively. In this way the output of the kth node of the output layer can be expressed as follows (Equation 7).

Function 10

$$y_k \equiv z_k^{(L)} = \frac{\exp(u_k^{(L)})}{\sum_{j=1}^{K} \exp(u_j^{(L)})} \quad (式 7)$$

Equation 7 is a softmax function. The output $y_1, \ldots, y_K$ is always 1.

Each class is expressed as $C_1, \ldots, C_K$, and the output y of the node k of the output layer $L_K$(that is, $u_k^{(L)}$) indicates the probability that given input x belongs to class $C_K$. Please refer to Equation 8 below. The input x is classified into a class having the maximum probability represented by Equation 8.
Function 11

$$p(C_k|x) = y_k = z_k^{(L)} \quad (式 8)$$

In the learning of the neural network, the function expressed by the neural network is regarded as a model of the posterior probability of each class, and the likelihood of the weight w relative to the training data under such a probability model is evaluated and a weight w that maximizes likelihood is selected.

The target output $d_n$ by the softmax function of (Equation 7) is set to 1 only when the output is a correct class, and set to 0 when the output is otherwise. When the target output is expressed as vector form $d_n=[D_{n1}, \ldots, d_{nK}]$, for example, when the correct class of input $x_n$ is $C_3$, only the target output $d_{n3}$ is 1, and the other target outputs are 0. When encoding in this manner, the posterior distribution is represented as follows (Equation 9).

Function 12

$$p(d|x) = \Pi_{k=1}^{K} p(C_k|x)^{d_k}$$

(式 9)

Training data $\{(x_n, D_n)\}$ (N=1, ..., N) is expressed as follows (Equation 10). The error function of Equation 6 is derived by taking the logarithm of the likelihood L(w) and inverting the sign.

Function 13

$$L(w) = \prod_{n=1}^{N} p(d_n \mid x_n; w) = \prod_{n=1}^{N} \prod_{k=1}^{K} p(C_k \mid x_n)^{d_{nk}} = \prod_{n=1}^{N} \prod_{k=1}^{K} (y_k(x; w))^{d_{nk}}$$

(式 10)

Learning means minimizing the error function E(w) calculated based on the training data for the parameter w of the neural network. In the image analysis method according to the embodiment, the error function E(w) is expressed by (Equation 6).

Minimizing the error function E(w) for the parameter w has the same meaning as finding the local minima of the function E(w). The parameter w is the weight of the coupling between the nodes. The minimum point of the weight w is obtained by iterative calculation that iteratively updates the parameter w using an arbitrary initial value as a starting point. An example of such a calculation is the gradient descent method.

In the gradient descent method, a vector expressed by the following Equation 11 is used.

Function 14

$$\nabla E = \frac{\partial E}{\partial w} = \left[ \frac{\partial E}{\partial w_1}, \ldots, \frac{\partial E}{\partial w_M} \right]^T$$

(式 11)

In the gradient descent method, the process of moving the value of the current parameter w in the negative gradient direction (that is, $-\nabla E$) is repeated many times. When the current weight is designated $w^{(t)}$ and the weight after movement is $w^{(t+1)}$, the calculation by the gradient descent method is represented by the following Equation 12. The value t means the number of times the parameter w has been moved.

Function 15

$$w^{(t+1)} = w^{(t)} - \epsilon \nabla E$$

(式 12)

The symbol
Function 16
$\epsilon$
is a constant that determines the magnitude of the update amount of the parameter w, and is referred to as a learning coefficient. By repeating the operation represented by (Equation 12), the error function $E(w(w)^{(t)})$ decreases, and the parameter w reaches the minimum point.

Note that the calculation according to Equation 12 may be performed on all the training data (n=1, ..., N) or may be performed only on a part of the training data. The gradient descent method performed for only some of the training data is referred to as the stochastic gradient descent method. A stochastic gradient descent method is used in the image analysis method according to the embodiment.

Image Analysis Process

Figure 12:
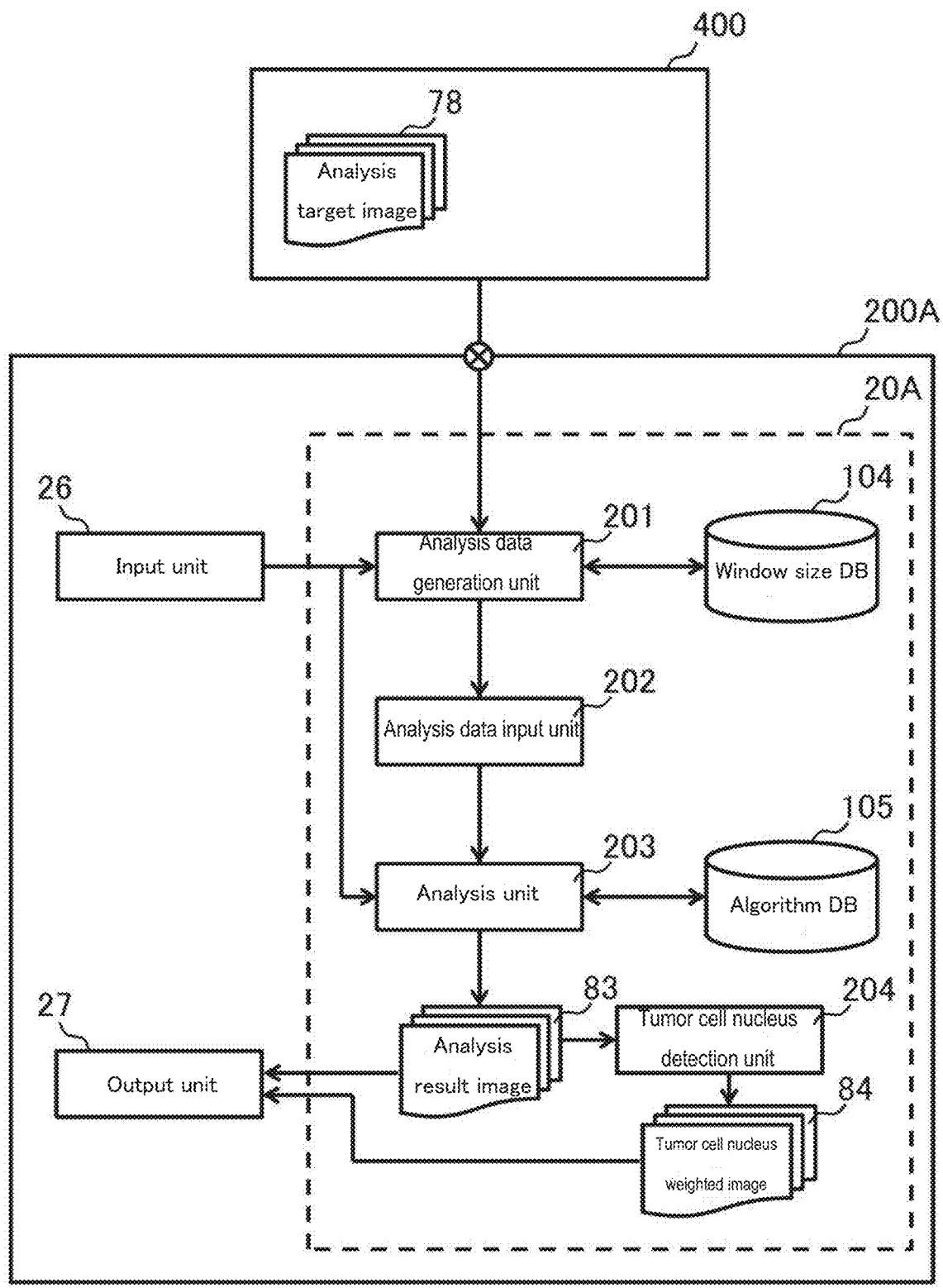
FIG. 12 is a block diagram describing the functions of an image analysis apparatus 200A according to the first embodiment.

Referring to FIG. 12, the processing unit 20A of the image analysis apparatus 200A according to the first embodiment includes an analysis data generation unit 201, an analysis data input unit 202, an analysis unit 203, and a tumor cell nucleus region detection unit 204. These functional blocks are realized by installing a program according to the present invention for causing a computer to execute an image analysis process in the recording unit 23 or the memory 22 of the processing unit 20A and executing this program by the CPU 21. The window size database 104 and the algorithm database 105 are provided from the deep learning apparatus 100A through the recording medium 98 or the network 99, and recorded in the recording unit 23 or the memory 22 of the processing unit 20A.

The analysis target image 78 of the analysis target tissue is captured in advance by the imaging device 400, and recorded in the recording unit 23 or the memory 22 of the processing unit 20A in advance. The deep learning algorithm 60 including the learned coupling weight w is stored in the algorithm database 105 in association with the type of tissue sample (for example, tissue name) from which the sample of the analysis target tissue is derived or the type of sample including cells, and functions as a program module which is a part of a program that causes a computer to execute an image analysis process. That is, the deep learning algorithm 60 is used in a computer having a CPU and a memory, and causes the computer to function to execute computation or processing of specific information corresponding to the purpose of use, such as outputting data indicating the tumorigenic state in the analysis target tissue. Specifically, the CPU 21 of the processing unit 20A performs the calculation of the neural network 60 based on the learned coupling weight w in accordance with the algorithm prescribed in the deep learning algorithm 60 recorded in the recording unit 23 or the memory 22. The CPU 21 of the processing unit 20A performs an operation on the captured analysis target image 78 of the analysis target tissue which is input to the input layer 60a and outputs from the output layer 60b ternary image 83 of the data indicating the tumorigenic state in the analysis target tissue.

Figure 13:
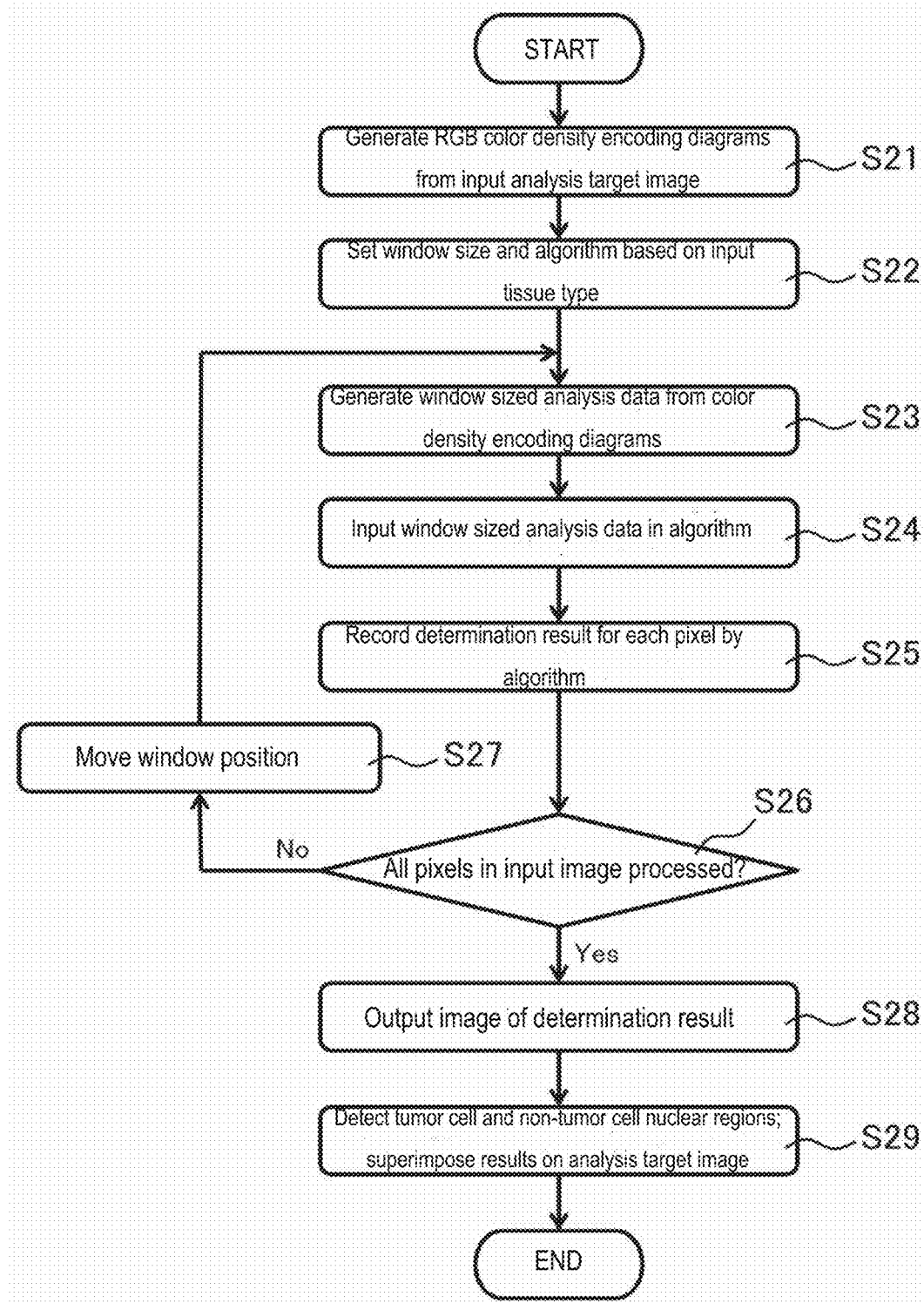
FIG. 13 is a flowchart showing a procedure of image analysis processing.

Referring to FIG. 13, the processing unit 20A of the image analysis apparatus 200A performs the processes shown in FIG. 13. When describing each function block shown in FIG. 12, the processes of steps S21 and S22 are performed by the analysis data generation unit 201. The processes of steps S23, S24, S26, and S27 are performed by the analysis data input unit 202. The processes of steps S25 and S28 are performed by the analysis unit 203. The process of step S29 is performed by the tumor cell nucleus region detection unit 204.

In step S21, the processing unit 20A generates color density encoded diagrams 79r, 79g, and 79b of R, G, and B colors from the input analysis target image 78. The generation method of the color density encoded diagrams 79r, 79g, and 79b is the same as the generation method at the time of the deep learning process shown in FIG. 10.

In step S22 shown in FIG. 13, the processing unit 20A accepts the input of the tissue type from the user on the image analysis apparatus 200A side as the analysis condition through the input unit 26. The processing unit 20A refers to the window size database 104 and the algorithm database 105 on the basis of the entered tissue type to set the window size used for analysis, and acquires the deep learning algorithm 60 used for analysis. The window size is a unit of analysis data to be input to the neural network 60 at the time of one input, and the product of the number of pixels of the window size analysis data 80 and the number of primary colors included in the image corresponds to the number of nodes of input layer 60a. The window size is associated with the tissue type, and stored in the window size database 104 in advance. The window size is, for example, 3×3 pixels as shown in the window W2 of FIG. 5. The deep learning algorithm 60 is also recorded in advance in the algorithm database 105 shown in FIG. 12 in association with the type of the tissue sample or the type of the sample including cells.

In step S23 shown in FIG. 13, the processing unit 20A generates the window size analysis data 80 from the color density encoded diagrams 79r, 79g, and 79b.

In step S24, the processing unit 20A inputs the analysis data 80 shown in FIG. 5 to the deep learning algorithm 60. The initial position of the window is, for example, a position at the center of 3×3 pixels in the window corresponding to the upper left corner of the analysis target image, as in step S16 in the deep learning process. When the processing unit 20A inputs the data 81 of a total of 27 color density values of 3×3 pixels×3 primary colors included in the window size analysis data 80 to the input layer 60a, the deep learning algorithm 60 outputs determination result 82 to the output layer 60b.

In step S25 shown in FIG. 13, the processing unit 20A records the determination result 82 output to the output layer 60b shown in FIG. 5. The determination result 82 is an estimated value (three values) of pixels located at the center of the color density encoded diagrams 79r, 79g, and 79b, which are analysis targets. For example, the cell nucleus of the tumor cell is indicated when the estimated value is 1, the cell nucleus of the non-tumor cell is indicated when the estimated value is 2, and other than the cell nucleus is indicated when the estimated value is 0.

In step S26 shown in FIG. 13, the processing unit 20A determines whether all the pixels in the input image have been processed. The input image is the color density encoded diagrams 79r, 79g, and 79b shown in FIG. 5, and the process of step S28 is performed for all the pixels in the color density encoded diagrams 79r, 79g, and 79b, when the series of processes from step S23 to step S25 shown in FIG. 13 has been performed.

When all the pixels in the input image have not been processed, in step S27 the processing unit 20A moves the center position of the window W2 by one pixel unit within the color density encoded diagrams 79r, 79g, and 79b shown in FIG. 5 similarly to step S20 in the deep learning process. Thereafter, the processing unit 20A performs a series of processes from step S23 to step S25 at the position of the new window W2 after movement. In step S25, the processing unit 20A records the determination result 82 corresponding to the new window position after the movement. A ternary image 83 of the analysis result is obtained by recording the discrimination result 82 for each window size on all the pixels in the analysis target image. The image size of the ternary image 83 as the analysis result is the same as the image size of the analysis target image. Here, in the ternary image 83, the value 2, the value 1 and the value 0 of the estimated value may be numerical data attached to each pixel, and also may be an image indicated by a display color associated with, for example, the value 2, the value 1 and the value 0 instead of the estimated value 2, value 1 and value 0.

In step S28 shown in FIG. 13, the processing unit 20A outputs the ternary image 83 of the analysis result to the output unit 27.

In step S29 following step S28, the processing unit 20A also performs a tumor cell nucleus region detection process on the ternary image 83 of the analysis result. In the ternary image 83, the cell nucleus of the tumor cell, the cell nucleus of the non-tumor cell, and the non-nuclear region of cells are distinguished from each other by three values. Therefore, in the ternary image 83, the cell nucleus of the tumor cell can be distinguished by detecting the position of the pixel whose estimated value changes from 1 to 0 or the pixel changing from 0 to 1. As another aspect, it is possible to detect the boundary between the cell nucleus of the tumor cell and the other region (that is, non-tumor cell nucleus or non-nuclear cell region), that is, the region of the tumor cell nucleus.

Although optional, the processing unit 20A may create a tumor cell nucleus region weighted image 84 by superimposing the region of the obtained tumor cell nucleus on the analysis target image 78. The processing unit 20A outputs the created tumor cell nucleus region weighted image 84 to the output unit 27, and ends the image analysis process.

As described above, the user of the image analysis apparatus 200A can acquire the ternary image 83 as the analysis result by inputting the analysis target image 78 of the analysis target tissue to the image analysis apparatus 200A. The ternary image 83 represents the cell nucleus of the tumor cell, the cell nucleus of the non-tumor cell, and the cell nucleus in the analysis target sample, and it is possible for the user to discriminate the region of the tumor cell nucleus in the analysis target sample.

The user of the image analysis apparatus 200A also can acquire the tumor cell nucleus region weighted image 84 as the analysis result. The tumor cell nucleus region weighted image 84 is generated, for example, by filling the region of the tumor cell nucleus with a color in the analysis target image 78. In another aspect, the tumor cell nucleus region weighted image 83 is generated by overlapping the boundary line between the region of the tumor cell nucleus and the other region (that is, non-tumor cell nucleus or non-nuclear cell region). In this way the user can comprehend the region of the nucleus of the tumor cell at a glance in the analysis target tissue, and it is possible to grasp the tumorigenic state of the cell at a glance.

Showing the region of the tumor cell nucleus in the analysis target sample helps a person not familiar with the sample to understand the tumorigenic state of the cell nucleus.

Second Embodiment

Hereinafter, the image analysis system according to the second embodiment will be described with respect to points different from the image analysis system according to the first embodiment.

Structure Summary

Figure 14:
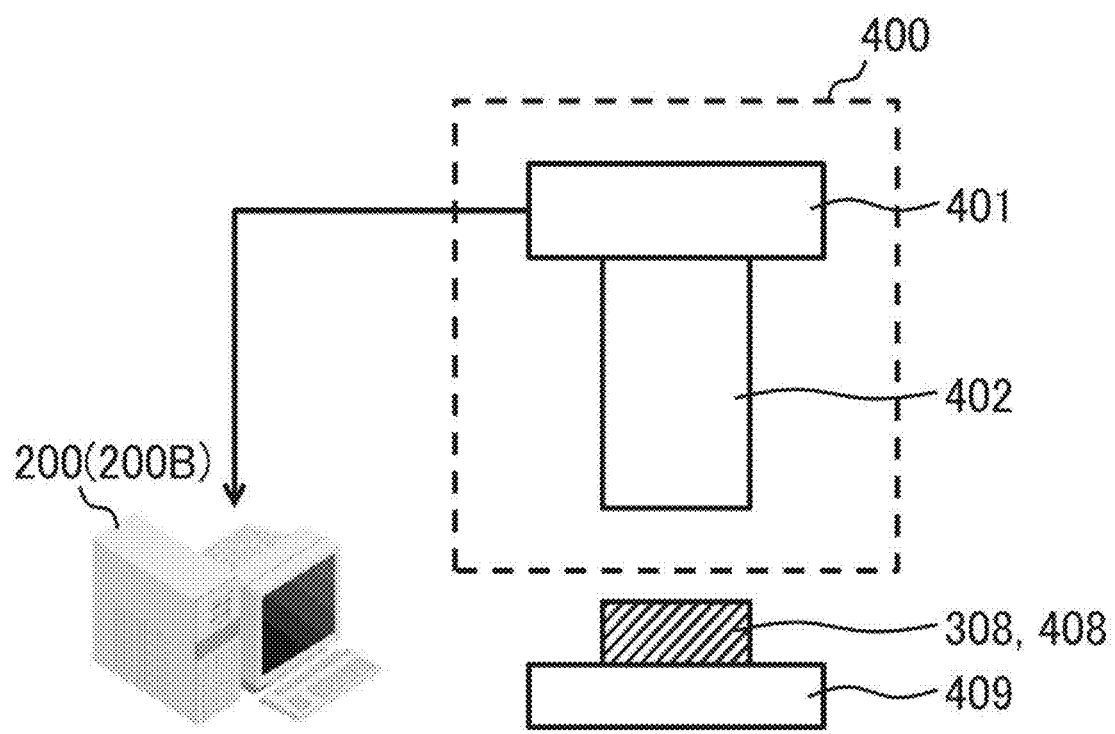
FIG. 14 is a schematic structural diagram of an image analysis system according to a second embodiment.

Referring to FIG. 14, the image analysis system according to the second embodiment includes a user side apparatus 200, and the user side apparatus 200 operates as an integrated image analysis apparatus 200B. The image analysis apparatus 200B is configured by, for example, a general-purpose computer, and performs both of the deep learning process and the image analysis process described in the first embodiment. That is, the image analysis system according to the second embodiment is a stand-alone system that performs deep learning and image analysis on the user side. The image analysis system according to the second embodiment differs from the image analysis system according to the first embodiment in that the integrated type image analysis apparatus 200B installed on the user side has the functions of both the deep learning apparatus 100A and the image analysis apparatus 200A according to the first embodiment.

The image analysis apparatus 200B is connected to the imaging apparatus 400. At the time of the deep learning process, the imaging apparatus 400 acquires the first training image 70C and the second training image 71C of the learning tissue and acquires the analysis target image 78 of the analysis target tissue at the time of the image analysis process.

Hardware Structure

The hardware configuration of the image analysis apparatus 200B is similar to the hardware configuration of the user side apparatus 200 shown in FIG. 8.

Function Block and Processing Procedure

Figure 15:
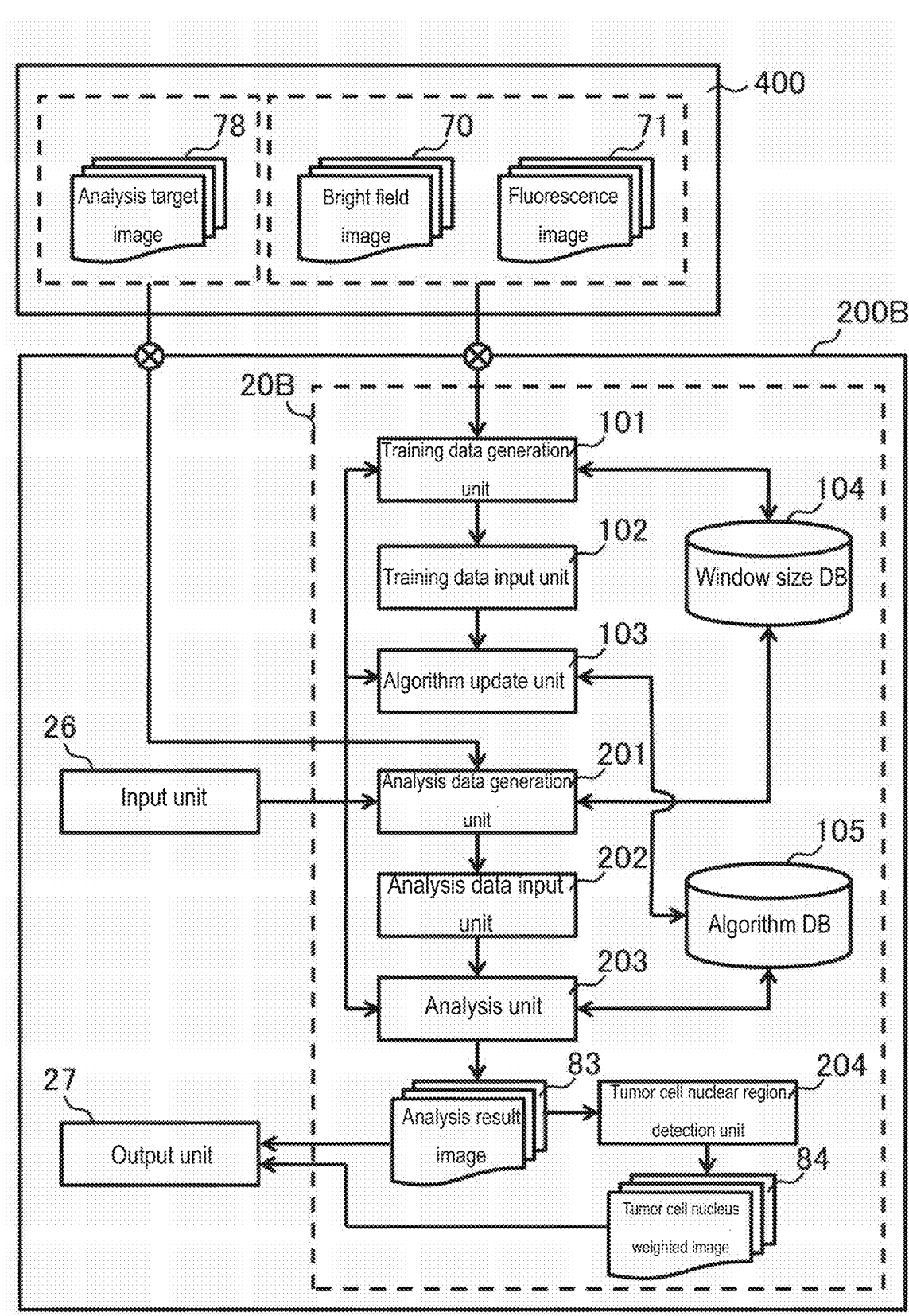
FIG. 15 is a block diagram describing the function of an integrated type image analysis apparatus 200B according to the second embodiment.

Referring to FIG. 15, the processing unit 20B of the image analysis apparatus 200B according to the second embodiment includes a training data generation unit 101, a training data input unit 102, an algorithm update unit 103, an analysis data generation unit 201, an analysis data input unit 202, an analysis unit 203, and a tumor cell nucleus region detection unit 204. These functional blocks are realized by installing a program that causes a computer to execute a deep learning process and an image analysis process in the recording unit 23 or the memory 22 of the processing unit 20B and executing this program by the CPU 21. The window size database 104 and the algorithm database 105 are recorded in the recording unit 23 or the memory 22 of the processing unit 20B, and both are used jointly during deep learning and image analysis processing. The learned neural network 60 is stored beforehand in the algorithm database 105 in association with the type of tissue or the type of sample including cells, the coupling weight w is updated by the deep learning process, and stored as the deep learning algorithm 60 in the algorithm database 105. It should be noted that the first training image 70C and the second training image 71C which are the first training images for learning are captured in advance by the imaging apparatus 400 and stored in advance in the recording unit 23 or the memory 22 of the processing unit 20B. The analysis target image 78 of the analysis target sample is also imaged in advance by the imaging apparatus 400 and recorded in the recording unit 23 or the memory 22 of the processing unit 20B in advance.

The processing unit 20B of the image analysis apparatus 200B performs the processing shown in FIG. 10 at the time of the deep learning process and the processing shown in FIG. 13 at the time of the image analysis process. When describing each function block shown in FIG. 15, the processes of steps S10 to S14, S19 and S20 are performed by the training data generating unit 101 during the deep learning process. The process of step S15 is performed by the training data input unit 102. The processes of steps S16 to S18 are performed by the algorithm updating unit 103. The processes of steps S21 and S22 are performed by the analysis data generation unit 201 at the time of image analysis process. The processes of steps S23, S24, S26, and S27 are performed by the analysis data input unit 202. The processes of steps S25 and S28 are performed by the analysis unit 203. The process of step S29 is performed by the tumor cell nucleus region detection unit 204.

The procedure of the deep learning process and the procedure of the image analysis process performed by the image analysis apparatus 200B according to the second embodiment are similar to the procedures performed by the deep learning apparatus 100A and the image analysis apparatus 200A according to the first embodiment. Note that the image analysis apparatus 200B according to the second embodiment differs from the deep learning apparatus 100A and the image analysis apparatus 200A according to the first embodiment in the following points.

In step S14 at the time of the deep learning process, the processing unit 20B receives an input of the type of tissue for learning from the user of the image analysis apparatus 200B via the input unit 26. The processing unit 20B sets the window size by referring to the window size database 104 based on the type of the input tissue, and refers to the algorithm database 105 to set the neural network 50 used for learning.

As described above, the user of the image analysis apparatus 200B can acquire the ternary image 83 as the analysis result by inputting the analysis target image 78 to the image analysis apparatus 200B. The user of the image analysis apparatus 200B also can acquire the tumor cell nucleus region weighted image 84 as the analysis result.

According to the image analyzing apparatus 200 B according to the second embodiment, the user can use the type of tissue selected by the user as a tissue for learning. This means that the learning of the neural network 50 is not left to the vendor side, and the user himself can improve the degree of learning of the neural network 50.

Third Embodiment

Hereinafter, the image analysis system according to a third embodiment will be described with respect to points different from the image analysis system according to the second embodiment.

Structure Summary

Figure 16:
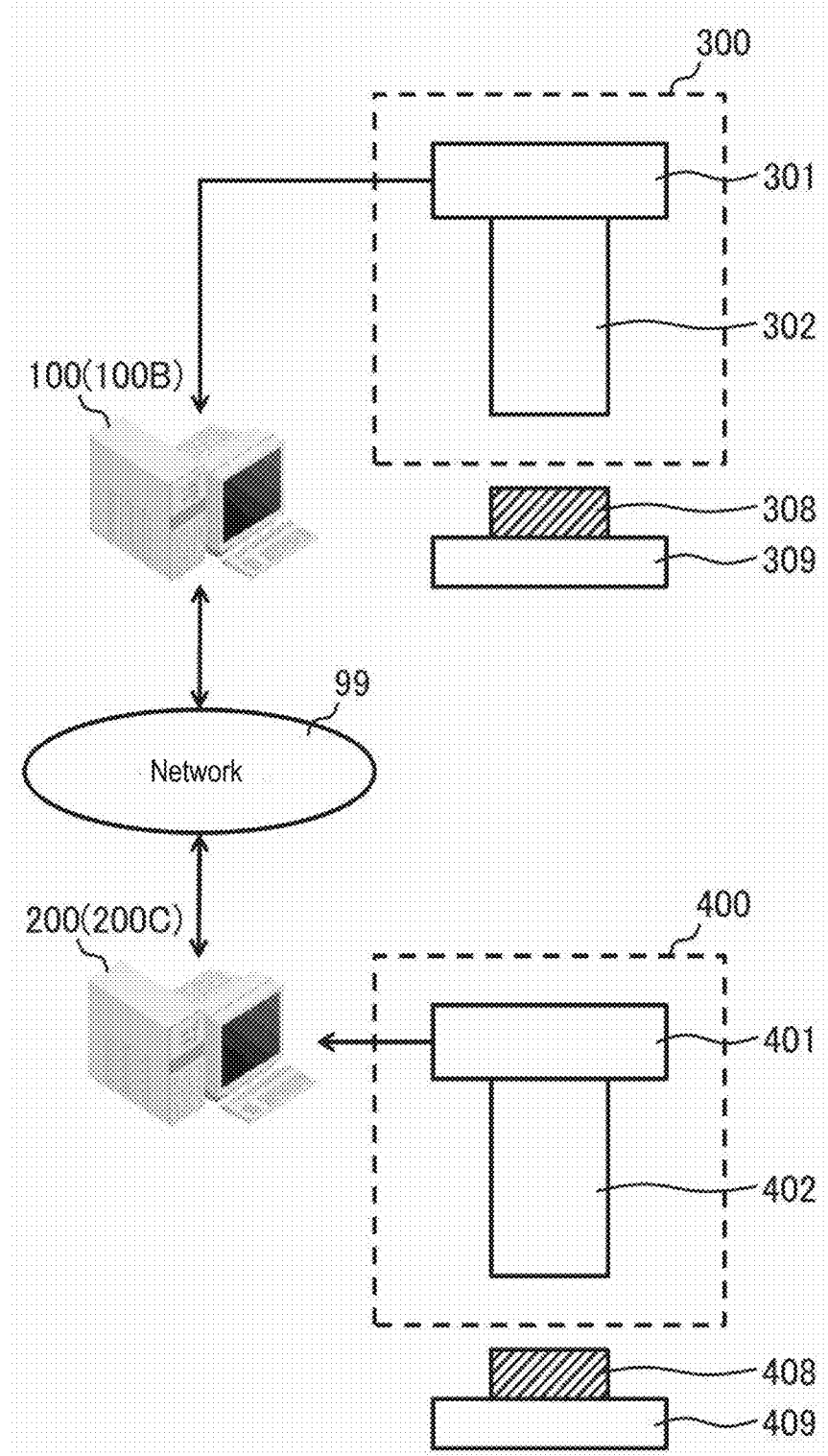
FIG. 16 is a schematic structural diagram of an image analysis system according to a third embodiment.

Referring to FIG. 16, the image analysis system according to the third embodiment includes a vender side apparatus 100 and a user side apparatus 200. The vendor side apparatus 100 operates as an integrated type image analysis apparatus 100B and the user side apparatus 200 operates as the terminal apparatus 200C. The image analysis apparatus 100B is, for example, a general-purpose computer and is a device on the cloud server side that performs both of the deep layer learning process and the image analysis process described in the first embodiment. The terminal apparatus 200C is composed of, for example, a general-purpose computer, and is a user side terminal apparatus that transmits an analysis target image to the image analysis apparatus 100B via the network 99, and receives an image of the analysis result from the image analysis apparatus 100B via the network 99.

The image analysis system according to the third embodiment is similar to the image analysis system according to the second embodiment in that the integrated image analysis apparatus 100B installed on the vendor side has the functions of both the deep learning apparatus 100A and the image analysis apparatus 200A according to the first embodiment. On the other hand, the image analysis system according to the third embodiment differs from the image analysis system according to the second embodiment in that it is provided a terminal apparatus 200C and supplies the input interface of the analysis target image and the output interface of the analysis result image to the terminal apparatus 200C on the user side. That is, the image analysis system according to the third embodiment is a client service type system in which the vendor side performs a deep learning process and an image analysis process and provides a cloud service type of input/output interface for analysis target images and analysis result images to the user side.

The image analysis apparatus 100B is connected to the imaging apparatus 300 and acquires the first training image 70C and the second training image 71C of the learning tissue captured by the imaging apparatus 300.

The terminal apparatus 200C is connected to the imaging apparatus 400, and acquires the analysis target image 78 of the analysis target tissue which is imaged by the imaging apparatus 400.

Hardware Structure

Figure 7:
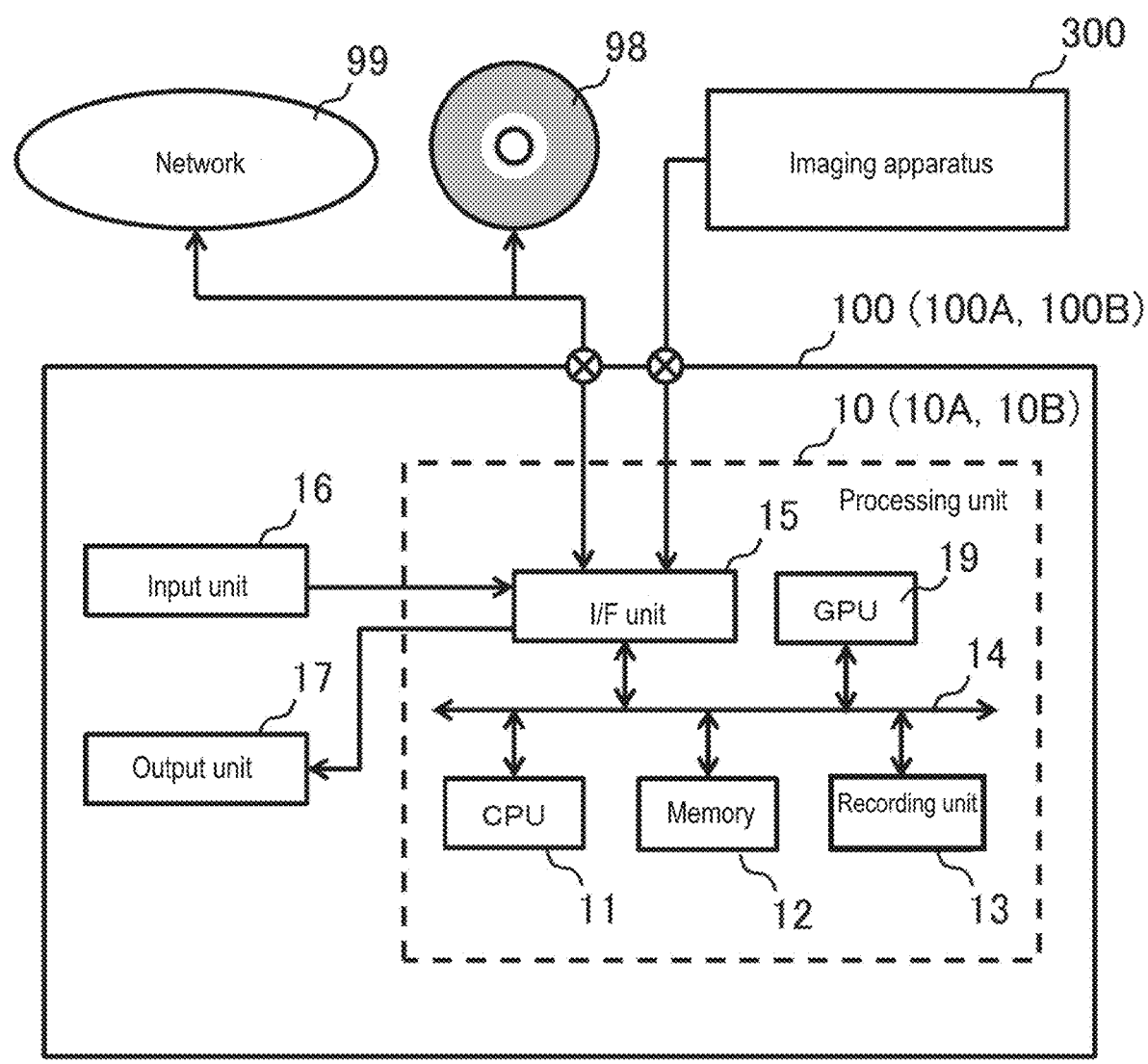
FIG. 7 is a block diagram showing a hardware configuration of a vendor-side apparatus 100.

The hardware configuration of the image analysis apparatus 100B is similar to the hardware configuration of the vendor-side apparatus 100 shown in FIG. 7. The hardware configuration of the terminal apparatus 200C is the same as the hardware configuration of the user apparatus 200 shown in FIG. 8.

Function Block and Processing Procedure

Figure 17:
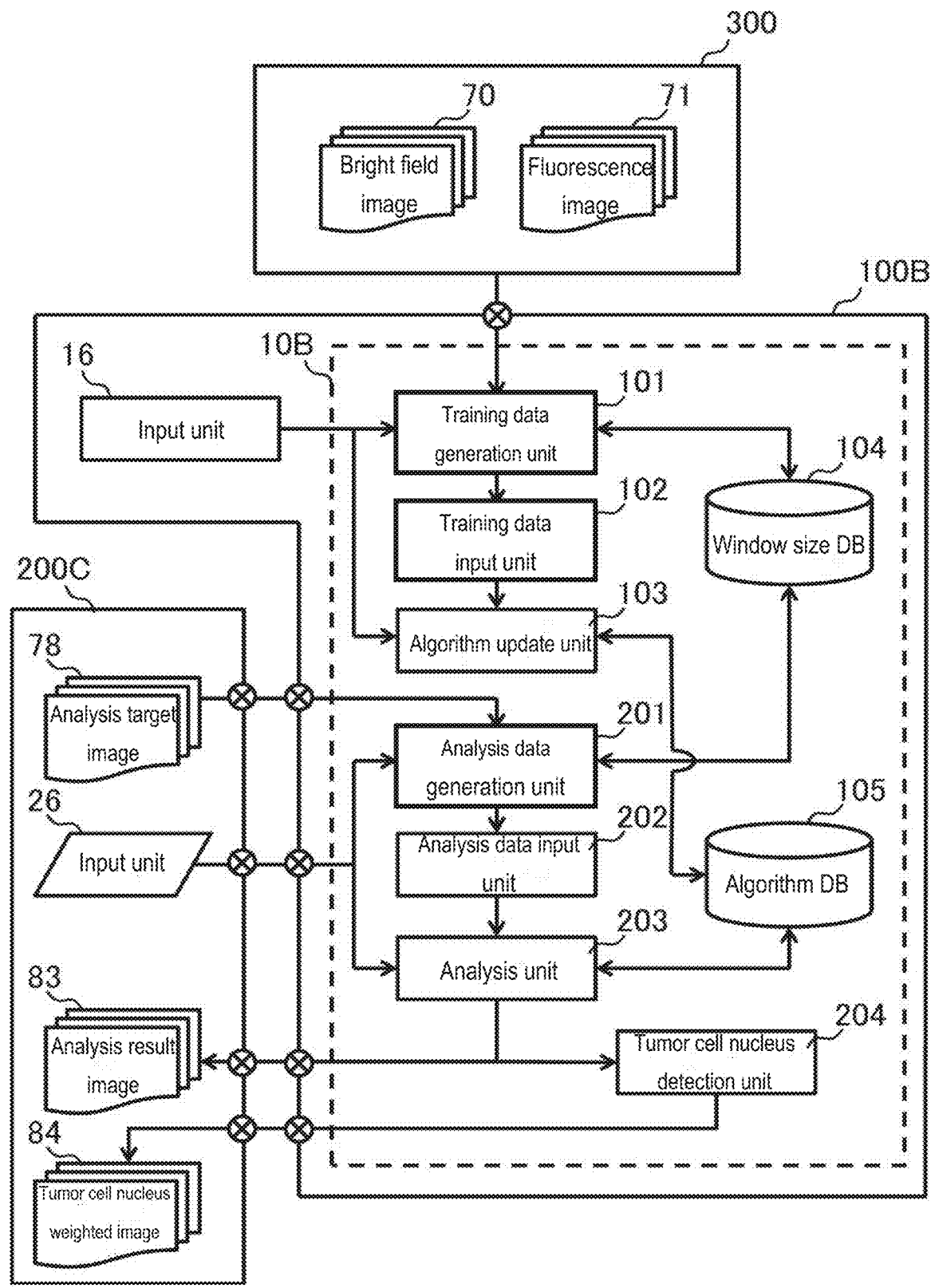
FIG. 17 is a block diagram describing the functions of an integrated type image analysis apparatus 100B according to the third embodiment.

Referring to FIG. 17, the processing unit 20B of the image analysis apparatus 200B according to the third embodiment includes a training data generation unit 101, a training data input unit 102, an algorithm update unit 103, an analysis data generation unit 201, an analysis data input unit 202, an analysis unit 203, and a tumor cell nucleus region detection unit 204. These functional blocks are realized by installing a program that causes a computer to execute a deep learning process and an image analysis process in the recording unit 13 or the memory 22 of the processing unit 10B and executing this program by the CPU 11. The window size database 104 and the algorithm database 105 are recorded in the recording unit 13 or the memory 12 of the processing unit 10B, and both are used jointly during deep learning and image analysis processing. The learned neural network 50 is stored beforehand in the algorithm database 105 in association with the type of tissue, the coupling weight w is updated by the deep learning process, and stored as the deep learning algorithm 60 in algorithm data base 105.

Note that the first training image 70C, the second training image 71C, the third training image 70NC, and the fourth training image 71NC for learning are captured in advance by the imaging apparatus 300, and stored in the recording unit 13 or the memory 12 of the processing unit 10B in advance. The analysis target image 78 of the analysis target tissue is also imaged in advance by the imaging apparatus 400 and recorded in the recording unit 23 or the memory 22 of the processing unit 20C of the terminal apparatus 200C in advance.

The processing unit 10B of the image analysis apparatus 100B performs the processing shown in FIG. 10 at the time of the deep learning process and the processing shown in FIG. 13 at the time of the image analysis process. When describing each function block shown in FIG. 17, the processes of steps S10 to S14, S19 and S20 are performed by the training data generating unit 101 during the deep learning process. The process of step S15 is performed by the training data input unit 102. The processes of steps S16 to S18 are performed by the algorithm updating unit 103. The processes of steps S21 and S22 are performed by the analysis data generation unit 201 at the time of image analysis process. The processes of steps S23, S24, S26, and S27 are performed by the analysis data input unit 202. The processes of steps S25 and S28 are performed by the analysis unit 203. The process of step S29 is performed by the tumor cell nucleus region detection unit 204.

The procedure of the deep learning process and the procedure of the image analysis process performed by the image analysis apparatus 100B according to the third embodiment are similar to the procedures performed by the deep learning apparatus 200A and the image analysis apparatus 200A according to the first embodiment. Note that the image analysis apparatus 100B according to the third embodiment differs from the deep learning apparatus 100A and the image analysis apparatus 200A according to the first embodiment in the following points.

The processing unit 10B receives the analysis target image 78 of the analysis target tissue from the terminal apparatus 200C on the user side, and generates color density encoded diagrams 79r, 79g, and 79b of R, G, and B colors from the received analysis target image 78 in step S21 during the image analysis process shown in FIG. 13. The generation method of the color density encoded diagrams 79r, 79g, and 79b is the same as the generation method at the time of the deep learning process shown in FIG. 10.

In step S22 at the time of the image analysis process shown in FIG. 13, the processing unit 10B receives the input of the tissue type from the user of the terminal apparatus 200C as the analysis condition through the input unit 26 of the terminal apparatus 200C. The processing unit 10B refers to the window size database 104 and the algorithm database 105 on the basis of the entered tissue type to set the window size used for analysis, and acquires the deep learning algorithm 60 used for analysis.

In step S28 during the image analysis process, the processing unit 10B transmits the ternary image 83 of the analysis result to the terminal apparatus 200C on the user side. In the terminal apparatus 200C on the user side, the processing unit 20C outputs the ternary image 83 of the received analysis result to the output unit 27.

In step S29 during the image analysis process, the processing unit 10B also performs a detection process of the region of the tumor cell nucleus on the ternary image 83 of the analysis result following step S28. As an optional step, the processing unit 10B creates a tumor cell nucleus region weighted image 84 by superimposing the region of the obtained tumor cell nucleus on the analysis target image 78. The processing unit 10B transmits the created tumor cell nucleus region weighted image 84 to the user terminal apparatus 200C. In the terminal device 200C on the user side, the processing unit 20C outputs the received tumor cell nucleus region weighted image 84 to the output unit 27, and ends the image analysis process.

As described above, the user of the terminal apparatus 200C can acquire the ternary image 83 as the analysis result by transmitting the analysis target image 78 of the analysis target tissue to the image analysis apparatus 100B. The user of the terminal apparatus 200C also can acquire the tumor cell nucleus region weighted image 84 as the analysis result.

According to the image analysis apparatus 100 B of the third embodiment, the user can be given the result of the image analysis process without acquiring the window size database 104 and the algorithm database 105 from the depth learning apparatus 100A. In this way it is possible to provide a service for discriminating the region of tumor cell nucleus and presenting a tumorigenic state as a cloud service for analyzing the analysis target tissue.

The number of pathologists is inadequate across the country. Pathologists are enrolled in a major hospital in urban areas, but most are not in remote medical institutions or in relatively small medical institutions such as clinics even in urban areas. The cloud service provided by the image analysis apparatus 100B and the terminal apparatus 200C aids tissue diagnosis and cytological diagnosis in such remote places or relatively small medical institutions.

Other Aspects

Although the present invention has been described in accordance with the summary and specific embodiments, the present invention is not limited to the above-described summary and specified embodiments.

Although the case of a gastric tumor has been described as an example in the first to third embodiments described above, the sample to be treated is not limited thereto, and a sample of the above-described tissue sample or a sample containing cells can be used.

Although the processing units 10A, 20B, and 10B refer to the window size database 104 to set the number of pixels of the window size in step S14 in the first to third embodiments, setting the pixel number of the window size may be directly set by the operator or the user. In this case, the window size database 104 is unnecessary.

Although the processing units 10A, 20B, and 10B set the number of pixels of the window size based on the type of the input organization in step S14 in the first to third embodiments, the size of the tissue also may be input instead of inputting the type of tissue. The processing units 10A, 20B, and 10B may set the number of pixels of the window size by referring to the window size database 104 based on the size of the input tissue. In step S22, as in step S14, the size of the tissue may be input instead of entering the type of tissue. The processing units 20A, 20B, and 10B may refer to the window size database 104 and the algorithm database 105 to set the number of pixels of the window size and acquire the neural network 60 based on the size of the input tissue.

Regarding the mode of entering the size of the tissue, the size may be directly input as a numerical value, or a user may input a predetermined numerical range corresponding to the size to be selected and input by the user, for example, using the input user interface as a pull-down menu.

In steps S14 and S22, in addition to the tissue type or the tissue size, the first training image 70C, the second training image 71C, the third training image 70NC and the fourth training image 71NC, and the imaging magnification at the time of imaging the analysis target image 78 also may be input. Regarding the mode of inputting the imaging magnification, the magnification may be directly input as a numerical value, or a user may select a predetermined numerical range corresponding to the magnification that the user intends to input, for example, using the input user interface as a pull-down menu.

Although the window size is set to 3×3 pixels for the sake of convenience in the deep learning process and the image analysis process in the first to third embodiments, the number of pixels of the window size is not limited to this. The window size also may be set according to, for example, the type of the tissue sample and the type of the sample including cells. In this case, it suffices that the product of the number of pixels of the window size and the number of primary colors included in the image corresponds to the number of nodes of the input layers 50a and 60a of the neural networks 50 and 60.

In step S14, the processing units 10A, 20B, and 10B also may acquire the number of pixels of the window size and correct the number of pixels of the acquired window size based on the input imaging magnification.

In step S18, the processing units 10A, 20B, and 10B record the deep layer learning algorithm 60 in the algorithm database 105 in association with the organization type on a one-to-one basis in the first to third embodiments. Alternatively, in step S18, the processing units 10A, 20B, 10B also may associate a plurality of tissue types with one deep learning algorithm 60 and record them in the algorithm database 105.

In the first to third embodiments the hue is defined by a combination of three primary colors of light or a combination of three primary colors of light, but the number of hues is not limited to three. The number of hues also may be four primary colors plus yellow (Y) to red (R), green (G), and blue (B), or three primary colors of red (R), green (G), and blue (B) It may be a two primary color in which any one hue is reduced as two primary colors. Alternatively, one primary color of only one of the three primary colors of red (R), green (G), and blue (B) (for example, green (G)) may be used. For example, the bright field images 70C and 70NC and the analysis target image 78 acquired using a known microscope, a virtual slide scanner or the like are not limited to color images of three primary colors of red (R), green (G), and blue (B), and may be a color image of two primary colors or an image containing one or more primary colors.

Although the processing units 10A, 20B, and 10B generate the color density encoded diagrams 72r, 72g, and 72b as single color images of three primary colors in step S10 in the first to third embodiments, the gradation of the primary colors of the color density encoded diagrams 72r, 72g, and 72b is not limited to 3 gradations. The gradation of the color density encoded diagrams 72r, 72g, and 72b may be an image of two gradations or may be an image of one gradation or more. Similarly, although the processing units 20A, 20B, and 10B generate single-color images for each primary color of the color density encoded diagrams 79r, 79g, and 79b in step S21, the gradation of the primary color is not limited to 3 gradations when generating the color density encoded diagram. The primary color when creating the color density encoded diagram may be an image of two gradations or may be an image of one or more gradations. Illustratively, the gradation of the color density encoded diagrams 72r, 72g, 72b, 79r, 79g, 79b can be set to 256 levels (8 gradations) with color density values from value 0 to value 255.

Although the processing units 10A, 20B, and 10B generate R, G, B color density encoded graphics 72r, 72g, and 72b from the input first training image 70C or the third training image 70NC in step S10 in the first to third embodiments, the input first training image 70C may be gradated in advance. That is, the processing units 10A, 20B, and 10B may directly obtain the color density encoded diagrams 72r, 72g, 72b of R, G, B colors from, for example, a virtual slide scanner or the like. Similarly, although the processing units 20A, 20B, and 10B generate the color density encoded diagrams 79r, 79g, and 79b of the respective colors of R, G, and B from the input analysis target image 78 in step S21, the input analysis target image 78 also may be gradated in advance. That is, the processing units 20A, 20B, and 10B may directly obtain the color density encoded diagrams 79r, 79g, and 79b of R, G, B colors from, for example, a virtual slide scanner or the like.

In the first to third embodiments described above, RGB is used for the color space when generating the color density encoded diagrams 72 and 79 from the first training images 70C and 78 of color, however, the color space is not limited to RGB. In addition to RGB, various color spaces can be used such as YUV, CMY, and CIE L*a*b*.

In the first to third embodiments, density values of each pixel are stored in the order of red (R), green (G), and blue (B) in the tumor site training data 74C and the analysis data 80, however, the order of storing and handling density values is not limited to this. For example, the density values also may be stored in the order of blue (B), green (G), and red (R), and it suffices if the arrangement order of the density values in the tumor site training data 74C and the non-tumor site training data 74NC is the same as the arrangement order of the density values in the analysis data 80.

In step S12 in the first to third embodiments, the processing units 10A, 20B, and 10B binarize the gradation of each pixel of the input second training image 71C and the input fourth training image 71NC to generate the second preliminary training data 71CN and the fourth preliminary training data 71NCN, however, the binarized second preliminary training data 71CN and the fourth preliminary training data 71NCN also may be acquired in advance.

Although the processing units 10A and 10B are realized as an integrated device in the first to third embodiments, the processing units 10A and 10B need not be integrated devices, and may be any of a CPU 11, a memory 12, a recording unit 13 and the like arranged in different locations and connected via a network. The processing units 10A and 10B, the input unit 16, and the output unit 17 are not necessarily arranged in one place, and they may be arranged separately from each other and connected to each other so as to communicate with each other via a network. The processing units 20A, 20B, 20C are also the same as the processing units 10A, 10B.

Although each function block of the training data generation unit 101, the training data input unit 102, the algorithm update unit 103, the analysis data generation unit 201, the analysis data input unit 202, the analysis unit 203, and the tumor cell nucleus region detection unit 204 is executed by a single CPU 11 or a single CPU 21 in the first to third embodiments, these function blocks are not necessary executed on a single CPU, and also may be distributedly executed among a plurality of CPUs. Each of these functional blocks also may be distributedly executed by a plurality of GPUs, or may be distributedly executed by a plurality of CPUs and a plurality of GPUs.

In the second and third embodiments described above, programs for performing the process of each step described in FIGS. 10 and 13 are recorded in the recording units 13 and 23 in advance. Alternatively, the program may be installed in the processing units 10B and 20B from a computer readable non-transitory tangible recording medium 98 such as a DVD-ROM or a USB memory. Alternatively, the processors 10B and 20B may be connected to the network 99, and the program may be downloaded and installed from, for example, an external server (not shown) via the network 99.

In the first to third embodiments, the input units 16 and 26 are input devices such as a keyboard or a mouse, and the output units 17 and 27 are realized as a display device such as a liquid crystal display. Alternatively, the input units 16 and 26 and the output units 17 and 27 may be integrated and realized as a touch panel type display device. Alternatively, the output units 17 and 27 may be composed of a printer or the like, and the ternary image 83 of the analysis result or the tumor cell nucleus region weighted image 84 of the cell nucleus may be printed and output.

Although the imaging device 300 is directly connected to the depth learning device 100A or the image analysis device 100B in the first to third embodiments, the imaging apparatus 300 also may be connected via the network 99 to the deep learning apparatus 100A, or may be connected to the image analyzing apparatus 100B. Similarly, although the imaging apparatus 400 is directly connected to the image analysis apparatus 200A or image analysis apparatus 200B, the imaging apparatus 400 also may be connected to the image analysis apparatus 200A or the image analysis apparatus 200B via the network 99.

EXAMPLES

Examples of the present invention will be shown below, and features of the present invention will be clarified.

Example 1

A deep learning process and image analysis process were performed in the stand-alone type system shown in the second embodiment. The tissues to be learned and analyzed were cancer tissues and non-cancerous tissues acquired from the stomach. Non-cancerous tissue was a region in which inflammation had occurred and was not judged as cancer. Image analysis processing using a learned deep learning algorithm was performed for each image known to contain cancer tissue and each image known to contain the non-cancerous tissue, and the analysis result was verified appropriate.

Details of the learning data and analysis data are described below.
Learning Data:
Four images were obtained by dividing the whole slide image into 512 (breakdown: two images for the region containing the cancer cell nucleus, two images for the region not containing the cancer cell nucleus)
Analysis Data for Verification:
Two images obtained by dividing the whole slide image into 512 (breakdown: one image for the region containing the cancer cell nucleus, one image for the region not containing the cancer cell nucleus)
Creation of Training Data and Learning
Whole slide images (WSI) of bright field images of stomach cancer tissue stained with HE and fluorescence images of stomach cancer tissues stained with DAPI were color imaged using a virtual slide scanner. The imaging magnification was 40 times. Thereafter, the color density values of each of the R, G, B colors were gradated based on the bright field image, and color density encoding diagrams of each color of R, G, B were prepared. A pathologist made a visual determination on the complete whole slide image including a region of a bright field image that contains a learning target tissue, a region of the cancer cell, and a region not including cancer cells. Thereafter, values for distinguishing the regions (binary) were given by discriminating between a region designated as a nuclear region of a cancer cell and a region designated as a nuclear region not including a cancer cell. The area of the bright field image including the tissue to be learned was extract from the whole slide image to generate the first preliminary training data and the third preliminary training data.

Note that a region including the nucleus of the cancer cell and a region not including the nucleus of the cancer cell were adopted as tissues to be learned, and each region was extracted from the whole slide image to obtain a binarized image.

Based on the DAPI-stained fluorescence image, the color density value was binarized a preset threshold value, and into the region of the cell nucleus and the other region by using the preset threshold value, and second preliminary training data and fourth preliminary training data used to prepare binarized image. The second training data and the fourth training data of a true value image were created from the binarized image showing the canceration state prepared by the pathologist visually determining the bright field image and the binarized image showing the region of the cell nucleus prepared from the fluorescence image prepared by the pathologist visually determining the bright field image.

Thereafter, the first training data and the second training data, which are color density encoding diagrams of the tumor tissue, were combined to create tumor site training data. Non-tumor site training data also were prepared by combining third training data and fourth training data which are color density encoding diagrams of non-tumor tissues. The created training data were divided into a window size of 113×113 pixels and the neural network learned the divided training data of the window size as the input layer. For example, the 113×113 pixels adopted as the window size is a size that supports including in the window the entire shape of the cell nucleus region of at least one cell among the plural cells of about two to nine cells.

Analysis Target Image Preparation

Similarly to the training data, a whole slide image of a bright field image of HE-stained gastric cancer tissue was color-imaged using a virtual slide scanner. The imaging magnification was 40 times. Thereafter, color density encoded diagrams of each color of R, G, and B were created based on the captured bright field image, and an analysis target image was created by combining the color density encoded diagrams of each of the created R, G, B colors.

Analysis Result

Analysis data with a window size of 113×113 pixels were created around each pixel of the analysis target image and analysis data for the created window size were input to the learned neural network. Pixels were classified into a region of the cancer cell nucleus, a region of the non-cancer cell nucleus, and a region other than the cell nucleus based on the analysis result output from the neural network, the contour of the region of the cancer cell nucleus was circumscribed in white, and the contour of the non-cancer cell nucleus was circumscribed in black. The analysis results are shown in FIGS. 18 and 19.

Figure 18A:
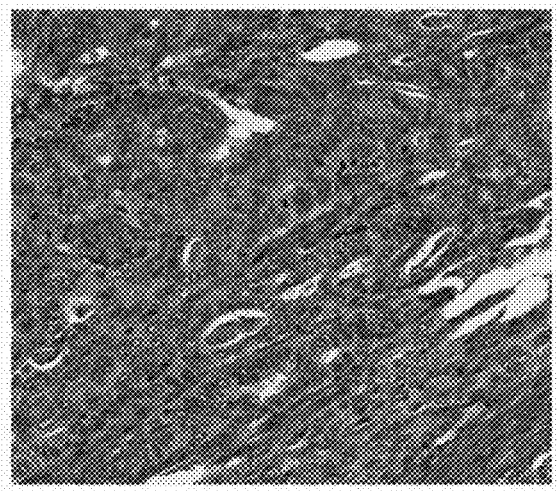
FIGS. 18A-18C are analysis results of an image (HE staining) of a cancer tissue sample obtained from a stomach shown in Example 1.
Figure 18B:
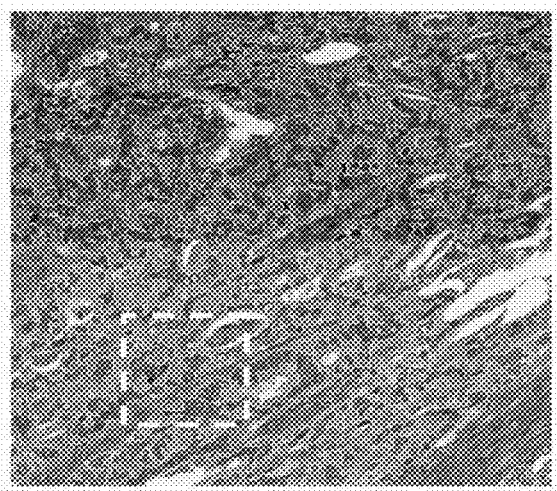
Figure 18C:
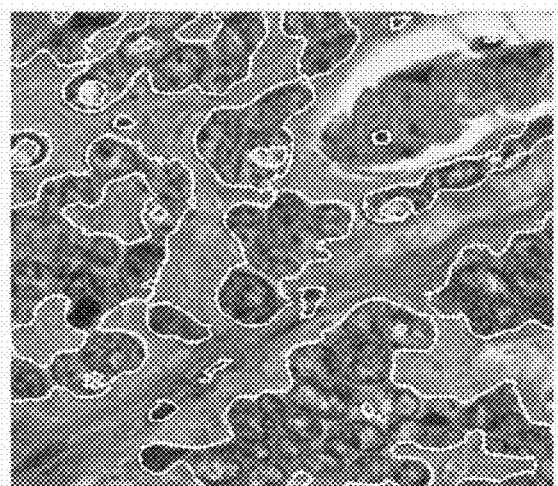

FIGS. 18A-18C show an analysis result of an image (HE staining) of a cancer tissue sample obtained from the stomach. FIG. 18A is a bright field image captured by HE staining of the cancer tissue, and it is an analysis target image. FIG. 18B is an image obtained by superimposing the contour of the cancer cell nucleus and the outline of the non-cancer cell nucleus obtained by the analysis process on the bright field image of FIG. 18A. FIG. 19C is an enlarged image of the region circumscribed by the white broken line in FIG. 19B. In FIGS. 18B and 18C, a region circumscribed in white is a region of a cancer cell nucleus, and a region circumscribed in black is a region of a non-cancer cell nucleus.

Since it is known that the analysis target image is an image including a cancer tissue, the analysis is appropriate if the region of the cancer cell nucleus is surrounded by white, and the analysis is inappropriate if the region of the cancer cell nucleus is erroneously surrounded by black. As shown in FIG. 18B, although a region surrounded by black appears somewhat, most of the region of the cancer cell nucleus is surrounded by white, thus confirming that the determination was properly performed in the determination target pixel as the nuclear region of the cancer cell.

Figure 19A:
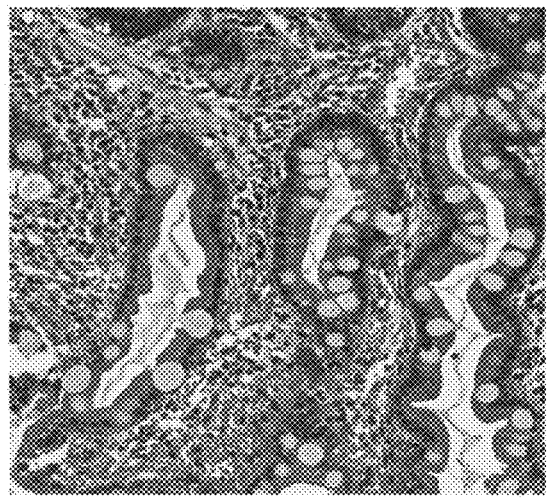
FIGS. 19A-19C are analysis results of an image (HE staining) of a non-cancerous tissue (inflamed tissue) sample obtained from the stomach shown in Example 1.
Figure 19B:
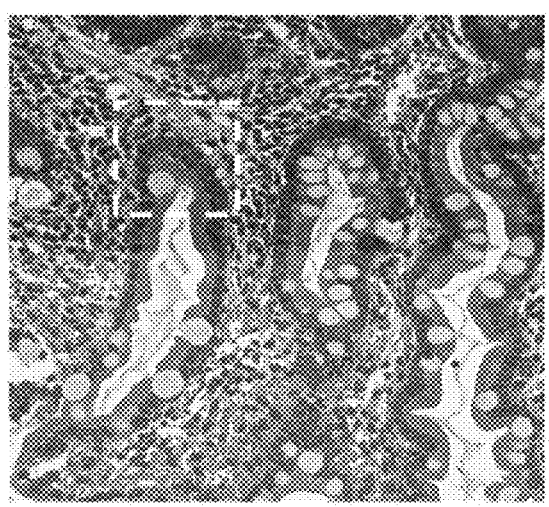
Figure 19C:
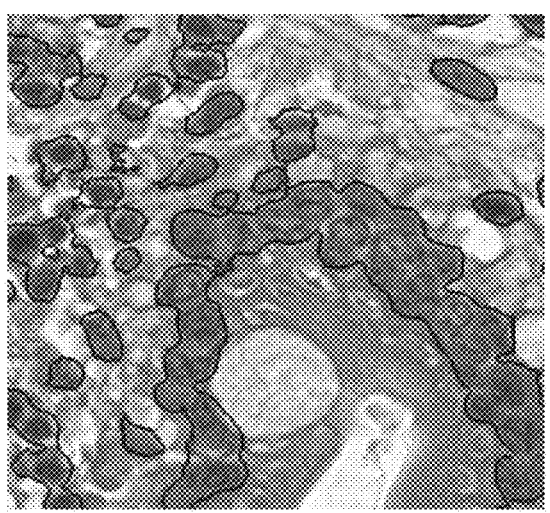

FIGS. 19A-19C show an analysis result of an image (HE staining) of a non-cancerous tissue sample obtained from the stomach. FIG. 19A is a bright field image captured by HE staining of a non-cancerous tissue and is an analysis target image. FIG. 19B shows the image of the contour of the cancer cell nucleus and the contour of the non-cancer cell nucleus obtained by the analysis process displayed while superimposed on the bright field image of FIG. 19A. FIG. 19C is an enlarged image of the region circumscribed by the white broken line in FIG. 19B. In FIGS. 19A and 19B, the region circumscribed in white is the region of cancer cell nucleus, and the region circumscribed in black is the region of non-cancer cell nucleus.

Since it is known that the analysis target image is an image including a non-cancer tissue, analysis is appropriate if the region of the non-cancer cell nucleus is circumscribed in black, and the analysis is inappropriate if the region of the non-cancer cell nucleus is erroneously circumscribed in white. As shown in FIG. 19B, almost no region circumscribed in white color appeared, almost all the region of the non-cancer cell nucleus is circumscribed in black color, and it was possible to confirm that the determination was properly performed in the determination target pixel as the nuclear region of the non-cancer cell.

Example 2

Comparison was made between the analysis result using the learned neural network created in the first embodiment and the analysis result using the existing machine learning algorithm.

A support vector machine was used as an existing machine learning algorithm. The same training data as the training data used for the training of the neural network in Example 1 above was used for the training of the support vector machine. The same image as the image used in the above-described Example 1 was used as the analysis target image. The analysis results are shown in FIGS. 20 to 23. Note that in FIGS. 20A-20D and FIGS. 21A-21D the image shown as the analysis result by the neural network is an image obtained by dividing the label value indicating the canceration state into three with respective values.

Figure 20A:
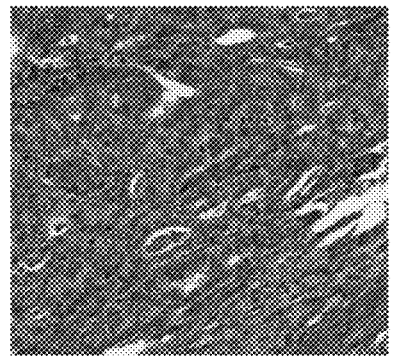
FIGS. 20A-20D are analysis results of an image (HE staining) of a cancer tissue sample obtained from a stomach by a learned neural network shown in Example 2.
Figure 20B:
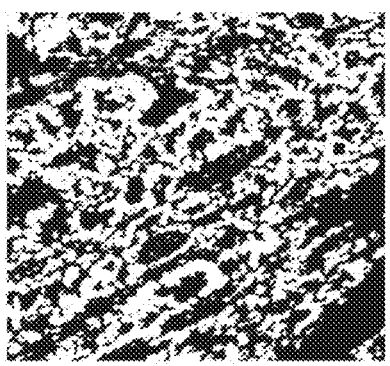
Figure 20C:
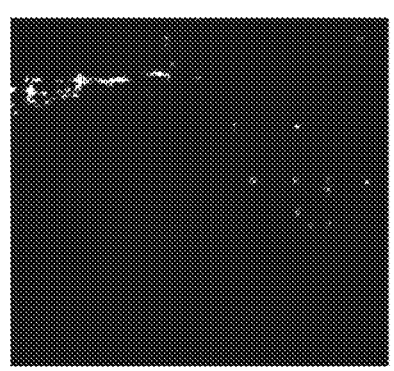
Figure 20D:

FIGS. 20A-20D are an analysis result using an image of a cancer tissue sample (HE staining) obtained from a stomach by a learned neural network as an analysis target image. FIG. 20A is a bright field analysis target image. FIG. 21B is an image showing a region determined to be a nucleus of a cancer cell, FIG. 21C is an image showing a region determined to be a nucleus of a non-cancer cell, FIG. 21D is an image showing a region determined to be other than a cell nucleus. In FIG. 20B the white region is a region determined to be a cancer cell nucleus, and in FIG. 20C the white region is a region determined to be a non-cancer cell nucleus.

Since it is known that the analysis target image is an image including a cancer tissue, the analysis is appropriate if the region of the cancer cell nucleus is represented in white in FIG. 20B. As shown in FIG. 20B, the region of the cancer cell nucleus is appropriately represented in white. In FIG. 20C there are few areas erroneously represented in white. From this, it was confirmed that, for an analysis target image which is known to be an image including a cancer tissue, it is possible to appropriately and clearly classify the region of cancer cell nucleus and the region of non-cancer cell nucleus.

Figure 21A:
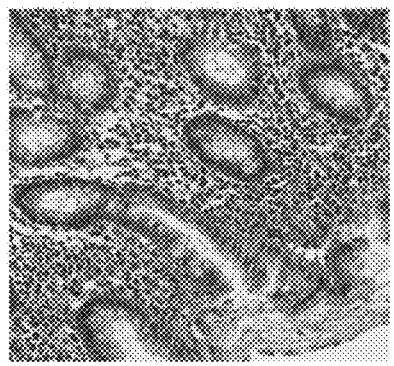
FIGS. 21A-21D are analysis results of an image (HE staining) of a non-cancerous tissue sample obtained from a stomach by a learned neural network shown in Example 2.
Figure 21B:
Figure 21C:
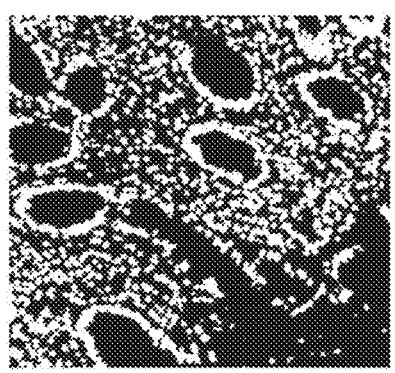
Figure 21D:
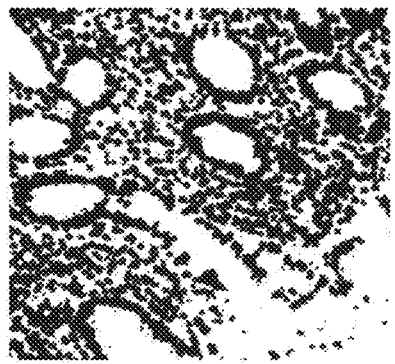

FIGS. 21A-21D are an analysis result using images (HE staining) of non-cancerous tissue samples acquired from the stomach by learned neural networks as analysis target images. FIG. 21A is a bright field analysis target image. FIG. 21B is an image showing a region determined to be a nucleus of a cancer cell, FIG. 21C is an image showing a region determined to be a nucleus of a non-cancer cell, FIG. 21D is an image showing a region determined to be other than a cell nucleus. In FIG. 21B the white region is a region determined to be the nucleus of a cancer cell, and in FIG.

21C the white region is the region determined to be the nucleus of a non-cancerous cell.

Since it is known that the analysis target image is an image including a non-cancerous tissue, in FIG. 21B, the analysis is inappropriate if the region of the non-cancer cell nucleus is erroneously represented in white. In FIG. 21B, there are few areas erroneously represented in white. As shown in FIG. 21C, the region of the non-cancer cell nucleus is appropriately represented in white. From this, it was confirmed that the region of the cancer cell nucleus and the region of the non-cancer cell nucleus can be appropriately and clearly classified even for an analysis target image known to be an image including the non-cancerous tissue.

Figure 22A:
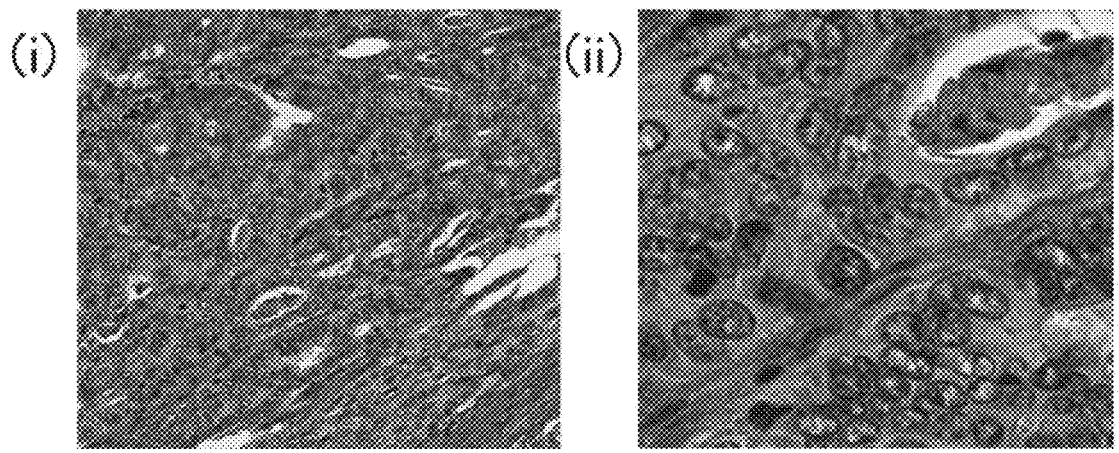
FIGS. 22A-22C are analysis results of an image (HE staining) of a cancer tissue sample obtained from a stomach by a support vector machine shown as a comparative example in Example 2.
Figure 22B:
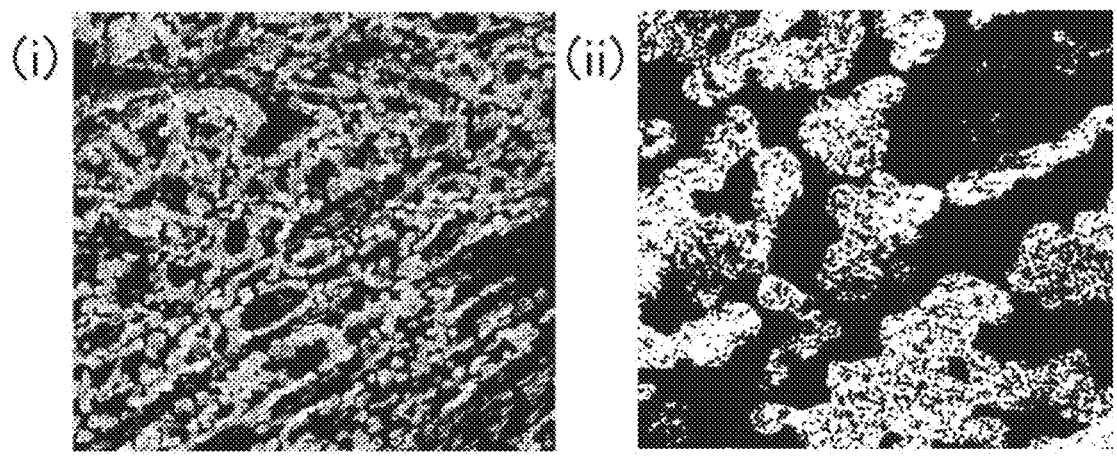
Figure 22C:
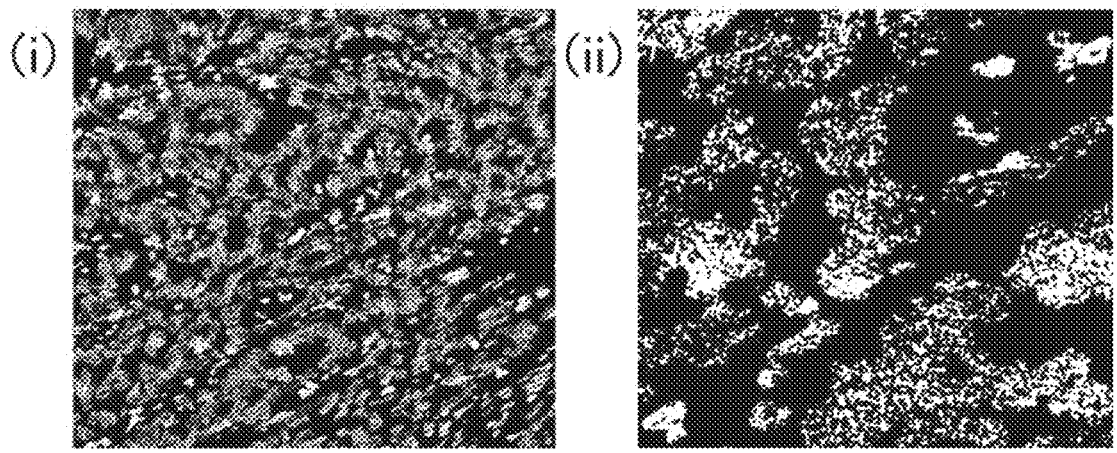

FIGS. 22A-22C are an analysis result showing, as a comparative example, an image of a cancer tissue sample (HE staining) obtained from a stomach by a support vector machine as an analysis target image. FIG. 22A is a bright field analysis target image. FIG. 23B is an image showing a region determined to be a nucleus of a cancer cell, and FIG. 23C is an image showing a region determined to be a nucleus of a non-cancer cell. In each FIG. 23A to 23C, an image obtained by enlarging a part of the image shown in (i) is shown in (ii). The positions of the enlarged areas are common in each FIG. 23A to 23C.

Figure 23A:
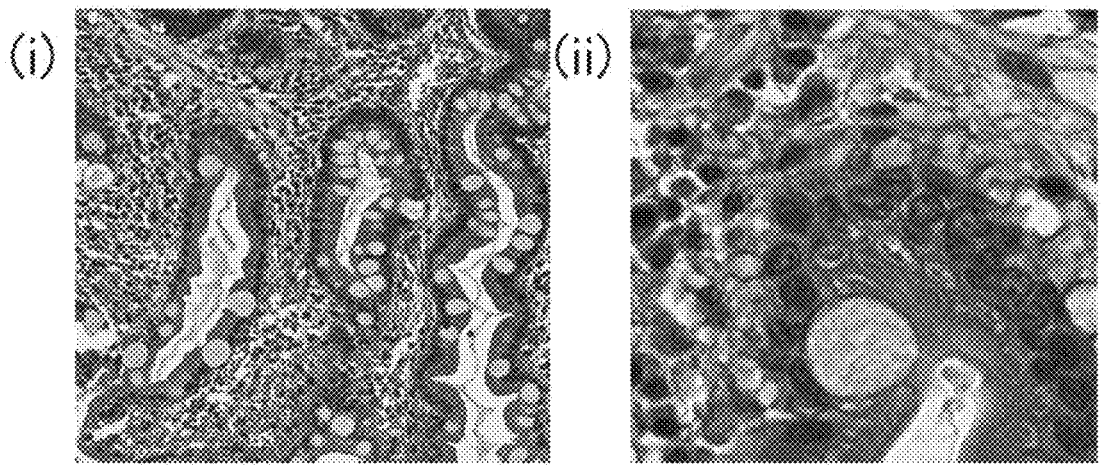
FIGS. 23A-23C are analysis results of an image (HE staining) of a non-cancerous tissue sample obtained from a stomach by a support vector machine shown as a comparative example in Example 2.
Figure 23B:
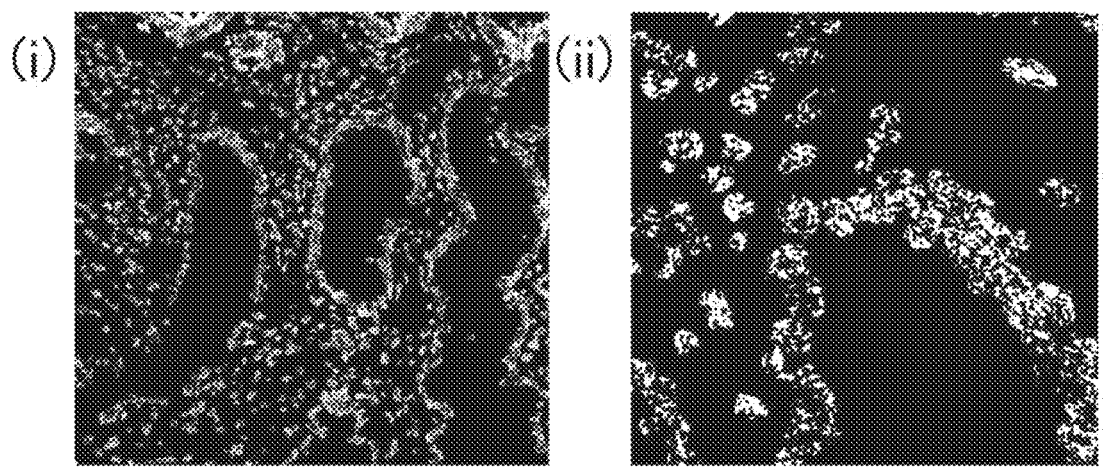
Figure 23C:
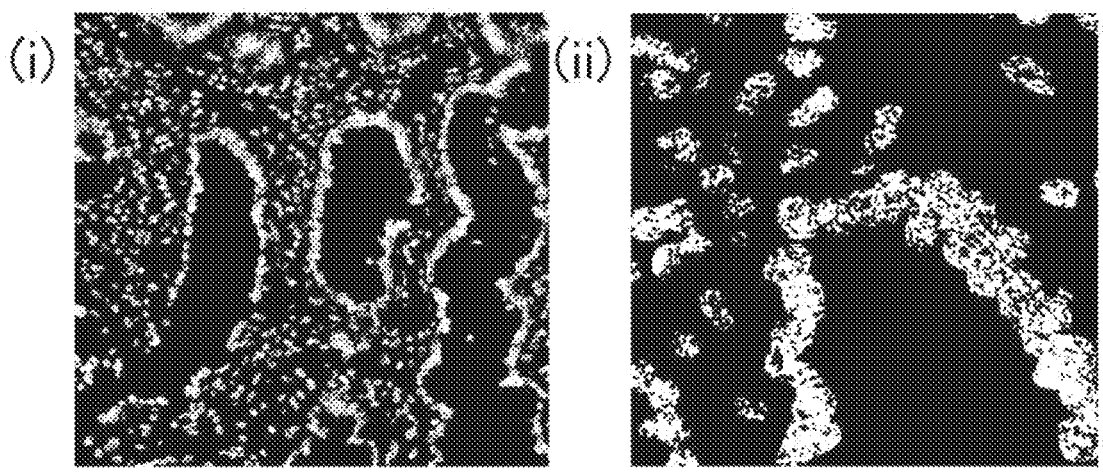

FIGS. 23A-23C are an analysis result showing, as a comparative example, an analysis target image (HE staining) of a non-cancerous tissue sample obtained from a stomach by a support vector machine. FIG. 23A is a bright field analysis target image. FIG. 23B is an image showing a region determined to be a nucleus of a cancer cell, and FIG. 23C is an image showing a region determined to be a nucleus of a non-cancer cell. In each FIG. 23A to 23C, an image obtained by enlarging a part of the image shown in (i) is shown in (ii). The positions of the enlarged areas are common in each FIG. 23A to 23C.

Referring to FIGS. 22B and 22C and FIGS. 23B and 23C, it is possible to grasp that there is some tendency with respect to the region of the cancer cell nucleus or the region of the non-cancer cell nucleus. However, in the analysis using a support vector machine shown as a comparative example, it was impossible to clearly classify the region of the cancer cell nucleus and the region of the non-cancer cell nucleus. Therefore, it can be confirmed that the analysis using the learned neural network created in the first embodiment has an advantageous effect on analysis using a support vector machine which is an existing machine learning algorithm.

What is claimed is:

1. An image analysis method for analyzing an image of a tissue or a cell using a deep learning algorithm of a neural network structure, the method comprising:
    generating analysis data from an analysis target image that includes the tissue or cell to be analyzed;
    inputting the analysis data to the deep learning algorithm;
    generating data indicating a tumorigenic state of a tissue or a cell in the analysis target image by the deep learning algorithm,
    wherein the data indicating the tumorigenic state include, for each pixel of the analysis target image, label information generated by the deep learning algorithm of the neural network structure and respectively indicative of whether the each pixel of the analysis target image corresponds to a nuclear region of a tumor cell or to other regions, wherein the label information for each pixel is generated by performing a determination process for each pixel.

2. The image analysis method according to claim 1, wherein
    the analysis target image is an image of a tissue diagnostic sample, and the analysis target image includes a hue comprised of one primary color or a hue obtained by combining two or more primary colors.

3. The image analysis method according to claim 2, wherein
    the sample is a stained sample, and the analysis target image is an image obtained by imaging the stained sample under a bright field microscope.

4. The image analysis method according to claim 1, wherein
    the analysis target image is an image of a cell diagnostic sample, and the analysis target image includes a hue comprised of one primary color or a hue obtained by combining two or more primary colors.

5. The image analysis method according to claim 1, wherein
    the data indicating the tumorigenic state are data indicating a boundary between the nuclear region of the tumor cell and another region.

6. The image analysis method according to claim 1, wherein
    the deep learning algorithm determines whether a nucleus is a nucleus of a tumor cell or a nucleus of a non-tumor cell.

7. The image analysis method according to claim 1, wherein
    a plurality of the analysis data are generated for each region having a predetermined number of pixels relative to one analysis target image.

8. The image analysis method according to claim 7, wherein
    analysis data are generated for each region of the predetermined number of pixels including peripheral pixels circumscribing a predetermined pixel;
    the deep learning algorithm generates a label indicating a tumorigenic state relative to the predetermined pixel of the input analysis data.

9. The image analysis method according to claim 7, wherein
    a number of nodes of an input layer of the neural network structure corresponds to the product of the predetermined number of pixels of the analysis data and a number of combined primary colors.

10. The image analysis method according to claim 1, wherein training data used for learning of the deep learning algorithm are generated based on:
    a sample image, which is a bright field image captured under a bright field microscope of a stained image of a sample prepared by staining for bright field observation of a sample of a tissue specimen containing a tumor collected from an individual or a sample of material containing a tumor cell collected from an individual; and
    a fluorescence image of a nucleus of a cell nucleus corresponding to the sample or a stained image of a sample prepared by applying fluorescent nuclear stain to the same sample under fluorescence observation of a fluorescence microscope, the fluorescence image being such that the position in the sample of the fluorescence image corresponds a position in the sample of the obtained bright field image.

11. The image analysis method according to claim 10, wherein
the staining for bright-field observation uses hematoxylin for nuclear staining.

12. The image analysis method of claim 11, wherein
the stain for bright field observation is hematological-eosin stain when the sample is a tissue sample; and
the stain for bright field observation is Papanicolaou stain when the sample is a material containing cells.

13. The image analysis method according to claim 10, wherein
the training data are generated for each region of a predetermined number of pixels in the bright field image.

14. The image analysis method according to claim 1, wherein
training data used for learning of the deep learning algorithm include a label value indicating a tumorigenic state of cells extracted from a bright field image and a fluorescence image.

15. The image analysis method according to claim 14, wherein
the training data include a label value indicative of tumorigenic state for each pixel of the bright field image.

16. The image analysis method according to claim 1, wherein
the deep learning algorithm classifies the analysis data into classes indicating a tumorigenic state of cells contained in the analysis target image.

17. The image analysis method according to claim 1, wherein
an output layer of the neural network structure is a node having a soft max function as an activation function.

18. The image analysis method according to claim 1, further comprising:
outputting the data indicating the tumorigenic state of the tissue or the cell in the analysis target image generated by the deep learning algorithm.

19. The image analysis method according to claim 1, wherein each label information is respectively indicative of whether the each pixel of the analysis target image corresponds to a nuclear region of a tumor cell, to a nuclear region of a non-tumor cell, or to other regions.

20. An image analysis apparatus for analyzing an image of a tissue or a cell using a deep learning algorithm of a neural network structure, the apparatus comprising:
a processing unit for generating analysis data from an analysis target image including an analysis target tissue or cell, inputting the analysis data into the deep learning algorithm, and generating data indicating the tumorigenic state of a tissue or a cell in an analysis target image by the deep learning algorithm,
wherein the data indicating the tumorigenic state include, for each pixel of the analysis target image, label information generated by the deep learning algorithm of the neural network structure and respectively indicative of whether the each pixel of the analysis target image corresponds to a nuclear region of a tumor cell or to other regions, wherein the processing unit is configured to generate the label information for each pixel by performing a determination process for each pixel.

21. The image analysis apparatus according to claim 20, wherein each label information is respectively indicative of whether the each pixel of the analysis target image corresponds to a nuclear region of a tumor cell, to a nuclear region of a non-tumor cell, or to other regions.

* * * * *